US010355760B2

(12) United States Patent
Yoo et al.

(10) Patent No.: US 10,355,760 B2
(45) Date of Patent: Jul. 16, 2019

(54) TECHNIQUES FOR SMALL CYCLIC DELAY DIVERSITY IN NEW RADIO

(71) Applicant: QUALCOMM Incorporated, San Diego, CA (US)

(72) Inventors: Taesang Yoo, Riverside, CA (US); Zhifei Fan, San Diego, CA (US); Dinkar Vasudevan, New Delhi (IN); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/413,539

(22) Filed: Jan. 24, 2017

(65) Prior Publication Data

US 2018/0048365 A1 Feb. 15, 2018

Related U.S. Application Data

(60) Provisional application No. 62/374,591, filed on Aug. 12, 2016.

(51) Int. Cl.
*H04B 7/0456* (2017.01)
*H04L 5/00* (2006.01)
(Continued)

(52) U.S. Cl.
CPC ......... *H04B 7/0456* (2013.01); *H04B 7/0473* (2013.01); *H04B 7/0486* (2013.01);
(Continued)

(58) Field of Classification Search
CPC .............. H04B 7/0456; H04B 27/2646; H04B 5/0048; H04B 7/0639; H04B 7/0473;
(Continued)

(56) References Cited

U.S. PATENT DOCUMENTS 8,149,942 B1* 4/2012 Wang ................... H04B 7/0626
375/267
2008/0192856 A1* 8/2008 Jongren ............... H04B 7/0617
375/267

(Continued)

FOREIGN PATENT DOCUMENTS

EP       2 015 503 A2    1/2009

OTHER PUBLICATIONS

Chang H-W., et al., "Achieving Arbitrary Multiplexing Rates for MIMO-OFDM Systems by Hybrid Cyclic Delay Diversity", IEEE Transactions on Communications, IEEE Service Center, Piscataway, NJ, USA, vol. 61, No. 3, Mar. 1, 2013, pp. 1072-1079, XP011504991, ISSN: 0090-6778, DOI: 10.11 09/TCOMM.2013.020413.120239.

(Continued)

*Primary Examiner* — Charles C Jiang
*Assistant Examiner* — Rosene Clark
(74) *Attorney, Agent, or Firm* — Linda G. Gunderson; Arent Fox

(57) ABSTRACT

Various aspects described herein relate to small cyclic delay diversity (SCDD) operation used in a wireless communication system (e.g., 5G New Radio). A method, a computer-readable medium, and an apparatus are provided. In an aspect, the method, computer-readable medium, or apparatus operates to identify a type of information for transmission, identify a rank associated with the type of information, and perform an SCDD precoding operation based at least in part on the identified type of information or the rank.

28 Claims, 10 Drawing Sheets

(51) Int. Cl.
  *H04L 27/26* (2006.01)
  *H04B 7/06* (2006.01)
(52) U.S. Cl.
  CPC ........... *H04B 7/063* (2013.01); *H04B 7/0639* (2013.01); *H04B 7/0671* (2013.01); *H04L 5/0048* (2013.01); *H04L 27/2646* (2013.01)
(58) Field of Classification Search
  CPC .... H04B 7/0486; H04B 7/063; H04B 7/0671; H04B 7/024; H04B 7/0413; H04B 7/0689; H04L 1/0026; H04L 1/0606; H04L 5/001; H04L 5/0023
  See application file for complete search history.

(56) References Cited

U.S. PATENT DOCUMENTS

2008/0247364 A1    10/2008   Kim et al.
2009/0275352 A1*   11/2009   Kim ..................... H04B 7/0671
                                                    455/509
2011/0222628 A1*    9/2011   Chun .................. H04B 7/0671
                                                    375/295
2014/0016714 A1*    1/2014   Chen ..................... H04B 7/024
                                                    375/260
2014/0219210 A1*    8/2014   Lunttila ............... H04L 5/0007
                                                    370/329
2016/0211895 A1*    7/2016   Onggosanusi ....... H04B 7/0404

OTHER PUBLICATIONS

International Search Report and Written Opinion—PCT/US2017/038800—ISA/EPO—dated Oct. 2, 2017. 16 pages.
Kishigami T., et al., "Uplink MIMO Schemes for IEEE802.16m; C80216m-08_717", IEEE Draft; vol. 802.16m, Jul. 7, 2008, pp. 1-7, XP017796476 [retrieved on Jul. 8, 2008].

* cited by examiner

TECHNIQUES FOR SMALL CYCLIC DELAY DIVERSITY IN NEW RADIO

CROSS-REFERENCE TO RELATED APPLICATION

This application claims the benefit of U.S. Provisional Application Ser. No. 62/374,591, entitled "TECHNIQUES FOR SMALL CYCLIC DELAY DIVERSITY IN NEW RADIO" and filed on Aug. 12, 2016, which is expressly incorporated by reference herein in its entirety.

BACKGROUND

Aspects of the present disclosure relate generally to wireless communication systems, and more particularly, to techniques for small cyclic delay diversity (SCDD) used in a wireless communication system (e.g., 5G New Radio).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A) which uses multiple-input multiple-output (MIMO) antenna technology. However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, as well as higher data rates and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology may include, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC), which can allow a very large number of connected devices and transmission of a relatively low volume of non-delay-sensitive information. In another aspect, 5G NR communications technology may use techniques for advanced beamforming and MIMO antenna, and efficient waveform modulation and coding schemes. In addition, as the demand for mobile broadband access continues to increase, there exists a need for further improvements in 5G communications technology and beyond. Preferably, these improvements should be applicable to other multi-access technologies and the telecommunication standards that employ these technologies.

Accordingly, new approaches may be desirable to improve system efficiency and reliability, for example, reducing transmission overhead and/or improving channel estimation, in order to satisfy consumer demand and improve user experience in wireless communications (e.g., 5G NR).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, a method for small cyclic delay diversity (SCDD) precoding operations is provided. The method may include identifying a type of information for transmission, identifying a rank associated with the type of information, and performing an SCDD precoding operation based at least in part on the identified type of information or the rank.

In another aspect of the disclosure, an apparatus for wireless communications is provided. The apparatus may include a memory configured to store instructions, and at least one processor coupled to the memory, the at least one processor is configured to execute the instructions to identify a type of information for transmission, identify a rank associated with the type of information, and perform an SCDD precoding operation based at least in part on the identified type of information or the rank.

In an aspect of the disclosure, a computer-readable medium used for SCDD precoding operations is provided. The computer-readable medium (e.g., a non-transitory computer-readable medium) may store computer executable code and comprises code to identify a type of information for transmission, identify a rank associated with the type of information, and perform an SCDD precoding operation based at least in part on the identified type of information or the rank.

In another aspect of the disclosure, another apparatus for wireless communications is provided. The apparatus may include means for identifying a type of information for transmission, means for identifying a rank associated with the type of information, and means for performing a small cyclic delay diversity (SCDD) precoding operation based at least in part on the identified type of information or the rank.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 1 is a diagram of an example of a telecommunications system, in accordance with one or more aspects described herein.

DETAILED DESCRIPTION

Figure 1:
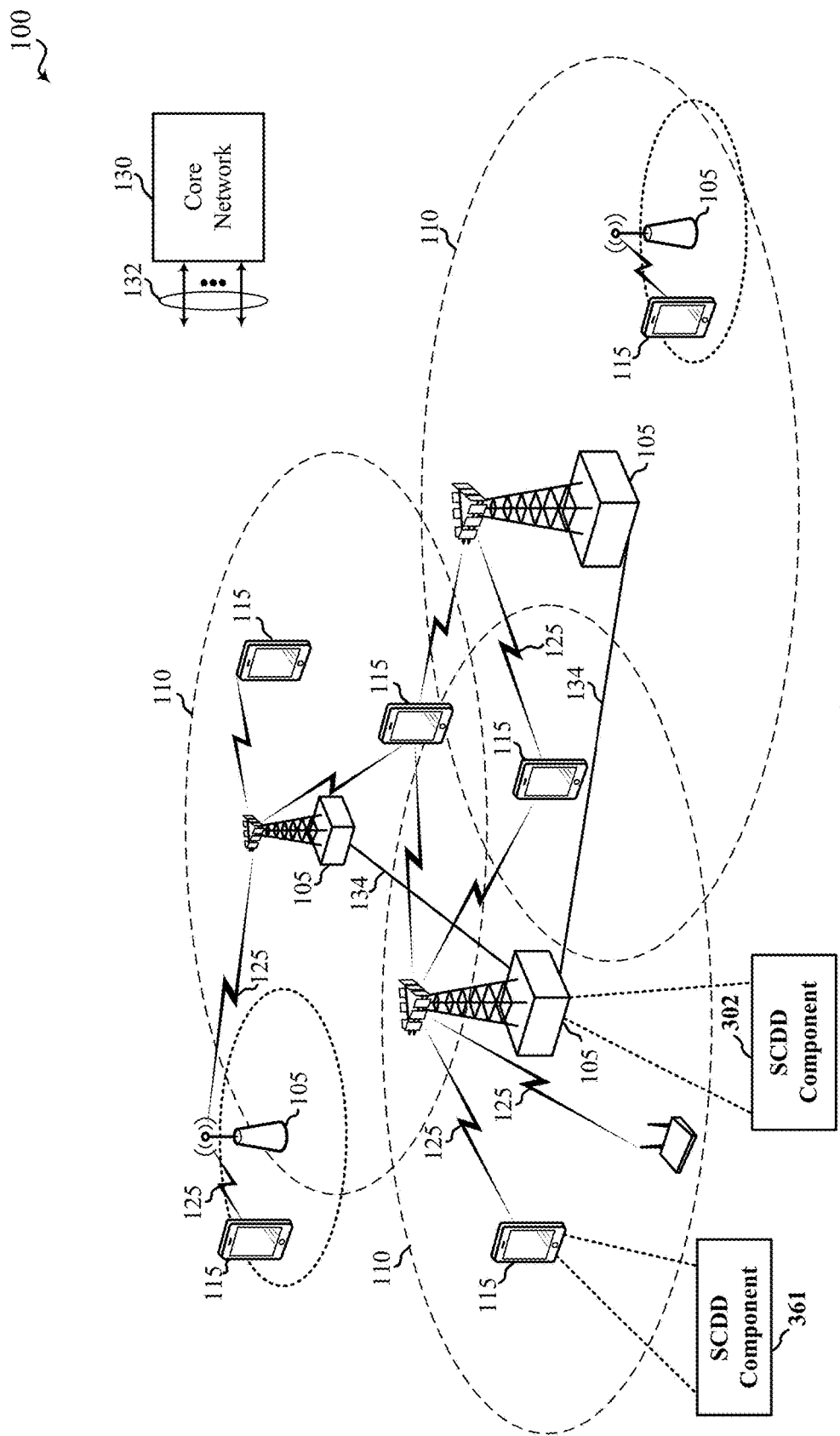

In wireless communications, channel resources are limited. However, demand for bandwidth is ever-increasing. In order to improve system efficiency and reliability, lower transmission overheads (e.g., reference signal (RS) overheads) and/or better channel estimation may be needed. As such, in some examples, new or improved precoding schemes, e.g., cyclic delay diversity (CDD) precoding schemes or operations, may be desirable in wireless communications systems (e.g., 5G communications systems). In an aspect, CCD is similar to delay diversity with, for example, the main difference that CDD may operate block-wise and may apply cyclic shifts, rather than linear delays, to different antennas.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to cyclic delay diversity (CDD) (e.g., small delay CDD (SCDD)) used for wireless communication systems (e.g., 5G New Radio). Initially orthogonal frequency division multiplexing (OFDM) systems use CDD as a transmit antenna diversity scheme, i.e., for rank 1 transmissions where single spatial stream is transmitted. In an aspect, CDD may increase the frequency diversity of the effective channel by transmitting from different antennas delayed versions of the time domain signal simultaneously, and may avoid inter-symbol interference (ISI). The delays are done in a cyclic manner to avoid exceeding the guard interval. In some examples, the delays may be a few microseconds and may introduce frequency dependent phase shifts. In an aspect, the values of the cyclic delays may depend on different bandwidths and/or channel conditions. For example, channel precoding may be changed from tone to tone, and a type of CDD, called small delay CDD (SCDD), may provide smaller amount of cyclic delays than a typical CDD or a large delay CDD (LCDD).

In an aspect, SCDD may take advantage of lower reference signal (RS) overhead, and/or better channel estimation in transmit diversity (e.g., with rank=1) or open-loop MIMO using precoder cycling (e.g., with rank≥2). For control channels, SCDD may enable one (1) cell-specific reference signal (CRS) port configuration. For transmit diversity and open-loop MIMO, SCDD may enable wideband channel estimation (e.g., because of the smooth and incremental phase changes in frequency domain associated with small cyclic delays). In an aspect, the SCDD scheme may be used for 5G New Radio system, including transmit diversity for two (2) and/or four (4) ports, and open-loop MIMO. Additionally, various aspects related to RS (e.g., cell-specific reference signal (CRS), demodulation reference signal (DMRS), channel state information reference signal (CSI-RS), or a sounding reference signal (SRS)) have also been described herein.

In an aspect, a wireless communications system may use a specific type or types of transmit diversity in which both the transmitter and receiver may be aware of the method and participate in its application(s). For example, schemes of transmit diversity may include space-time block codes (STBC) and space-frequency block codes (SFBC). In an aspect, space-time block coding is a general term used to indicate multi-antenna transmission schemes where modulation symbols are mapped in the time and spatial (e.g., transmit antenna(s)) domain to capture the diversity offered by multiple transmit antennas. Space-frequency block coding, in an aspect, is similar to space-time block coding, with the difference that the encoding is carried out in the antenna/frequency domains rather than in the antenna/time domains.

In another aspect, a combination of SFBC and frequency switched transmit diversity (FSTD), SFBC-FSTD, may be used. In an aspect, SCDD may be used as a transmit diversity scheme. In an aspect, by precoding RS and control or data signals, using SCDD for transmit diversity may use one RS port transmission, as compared to two RS ports used for SFBC/STBC, which may result in RS overhead saving and/or better channel estimation.

In an aspect, a wireless communication system may use a spatial multiplexing (e.g., MIMO) scheme. For example, a wireless communication system may use closed loop MIMO scheme and/or open-loop MIMO scheme. Closed-loop MIMO schemes may be used for low mobility scenarios, where, based on the feedback from the user equipment (UE), a precoder is chosen from a codebook. For scenarios with higher mobility, open-loop MIMO may be used for scenarios with higher mobility, where an increased level of diversity may be provided by the precoding. In an aspect, CDD based precoding is used to provide this diversity. In an aspect, the system may perform large delay CDD (LCDD) or small delay CDD (SCDD) when the system is using open-loop MIMO scheme.

In an aspect, when the system is using a MIMO scheme, the network may not have information or feedback from a user equipment (UE), or accurate precoding matrix indicator (PMI) feedback may not be available. For example, in a MIMO system, a transceiver may have no channel knowledge or insufficient channel knowledge, in other words, the transceiver is "blind" and does not know how to precode (or decode) the signals. In an aspect, due to lack of accurate knowledge of the codebook selections, there may be a use for a PMI-less operation (e.g., open-loop MIMO). In another aspect, there may be a use for open-loop MIMO due to Doppler Effect, limited channel state information (CSI) overhead, etc. In an aspect, large subcarrier spacing in 5G New Radio (NR) compared to the subcarrier spacing in LTE, and limited CSI overhead to cover larger system bandwidth may make PMI-less operation (e.g., open-loop MIMO) more attractive. In another aspect, CDD-based MIMO (e.g., transmission mode 3 (TM3)) may perform better than non-CDD-based MIMO (e.g., transmission mode 4 (TM4)) under inaccurate PMI.

In an aspect, as the precoding may change from tone to tone, the system may use a diversity scheme having a small tone-to-tone difference (e.g., SCDD with smaller cyclic delays) instead of a diversity scheme having a large tone-to-tone difference (e.g., LCDD with larger cyclic delays) for open-loop MIMO. The LCDD, in some examples, may be utilized with unprecoded RS (e.g., demodulation reference signal (DMRS)). However, in such a LCDD scheme, the LCDD may have a large RS overhead. In this case, for example, a receiver of a communication device (e.g., a UE or a base station) may use full Nrx-by-Ntx (Nrx: number of receiving antennas; Ntx: number of transmitting antennas) channel, for example, the communication device may monitor and estimate a 4×4 MIMO antenna/channel, to reconstruct a precoded channel, and a transmitter of another communication device (e.g., a base station or a UE) may send Ntx (e.g., DMRS) ports even when R<Ntx (R is the rank or the number of layers). Using Ntx RS ports to transmit R<Ntx layers is inefficient in terms of RS overhead. To reduce the RS overhead, in another aspect, the LCDD may be utilized with precoded RS (e.g., DMRS). In this case, for example, a receiver of a communication device (e.g., a UE or a base station) may directly estimate Nrx-by-R (Nrx: number of receiving antennas; R: the rank or the number of layers) channel (e.g., 4×2 channel), resulting in less RS overhead. However, the receiver may be forced to perform narrowband channel estimation for each physical resource block (PRB), which typically has increased channel estimation error than wideband channel estimation. In contrast, with SCDD for open-loop MIMO, the receiver of the communication device may directly estimate a Nrx-by-R (e.g., 4×2) precoded channel using wideband channel estimation, which may result in smaller RS overhead (e.g., pilot overhead) and decreased channel estimation error. In an aspect, both the RS and the data may be precoded. In another aspect, one precoding may be associated with one message or one control/data tone.

In another aspect, if two CRS ports (e.g., in an LTE system) are always present regardless of the control or data traffic, SFBC and/or LCDD may provide better diversity. For example, in a current communication system (e.g., an LTE system), LCDD may be used. In an aspect, all active layers may benefit from maximum diversity, and may ensure the same channel quality across layers. In an aspect, the LCDD scheme may be described in Equation (1) and Table 1 below:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad (1)$$

where "i" is a RE index, W(i) is a precoding matrix taken by cycling cycles through a subset of precoding matrices [Ntx-by-R], D(i) is tone-dependent large delay phase shift [R-by-R], and may be used to provide LCDD for a plurality of layers v as shown in Table 1. U is fixed discrete Fourier transform (DFT) matrix [R-by-R] as shown in Table 1. In an aspect, the LCDD scheme may include 2, 3, or 4 transmission layers (e.g., number of layers v as shown in Table 1).

TABLE 1

| Number of layers v | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j\pi i/4} & 0 \\ 0 & 0 & 0 & e^{-j6\pi i/4} \end{bmatrix}$ |

In an aspect, referring to Equation (1), W may be used to select a precoding subspace, however, this feature may not be utilized in LTE, as W cycles may be through all directions. U may perform layer virtualization within the subspace spanned by W. D(i) performs layer permutation and may be meaningless without U.

In an aspect, a cyclic shift diversity (CSD) scheme may be used in a wireless communications system (e.g., a Wi-Fi system). In an aspect, backward compatibility may be present by:

Legacy Short Training Field (L-STF), Legacy Long Training Field (L-LTF), Legacy Signal Field (L-SIG), High Throughput Signal Field (HT-SIG)
[0, 0.05, 0.1, 0.15] μs
Rank=1
Avoids unintended beamforming
And spatial expansion may be present by:
High Throughput Short Training Field (HT-STF), High Throughput Long Training Field (HT-LTF), data
[0, 0.4, 0.2, 0.6] μs In an aspect, the used CSD scheme may be described as an example below with Equation (2):

$$y = Q(i)D(i)x \quad (2)$$

where Q(i) is a tone-dependent spatial expansion matrix [Ntx-by-R]

$$\left( e.g., \begin{bmatrix} 1 & 0 \\ 0 & 1 \\ e^{-j2\pi i(-0.2usec)} & 0 \\ 0 & e^{-j2\pi i(-0.2usec)} \end{bmatrix} \right),$$

D(i) is a tone-dependent small delay phase shift [R by R]

$$\left( e.g., \begin{bmatrix} 1 & 0 \\ 0 & e^{-j2\pi i(-0.4usec)} \end{bmatrix} \right).$$

In the above example, $$Q(i)D(i) = \begin{bmatrix} 1 & 0 \\ 0 & e^{-j2\pi i(-0.4usec)} \\ e^{-j2\pi i(-0.2usec)} & 0 \\ 0 & e^{-j2\pi i(-0.6usec)} \end{bmatrix} \rightarrow CDD + \text{antenna selection}$$

In an aspect, the used CSD scheme may be lack of full diversity for a given layer, may lead to uneven channel quality across layers and/or uneven diversity in case of Rank 3.

In an aspect, a wireless communication system (e.g., 5G NR) may use an SCDD scheme described herein. In an aspect, the SCDD scheme may be presented by Equation (3) listed below:

$$y = W^*D(k)^*U_x \quad (3)$$

where "W" is a wideband fixed precoding matrix, [Ntx-by-Ntx'], which may be based on slow-varying PMI feedback or long term antenna correlation. Ntx is the number of transmit antenna (e.g., 2, 4, 8, 32, 64, 256, etc.). In an aspect, Ntx' is dimension of the subspace for precoding (e.g., 4), and "W" may be the [Ntx-by-Ntx] identity matrix when Ntx is small (e.g., 2, 4, or 8). D(k) (e.g., as shown in Equation (3) and Equation (4)) is a tone-dependent cyclic delay matrix, [Ntx'-by-Ntx'], where k is the RE index. U is stream virtualization, [Ntx'-by-R], for example, the first R columns chosen from the [Ntx'-by-Ntx'] DFT matrix. In some examples, virtualization may involve forming a virtual antenna by using precoding(s) to map each diversity stream to a unique subgroup of physical antennas. As a result, the total transmit power may be maximized by using all the power amplifiers on all the transmit antennas. In an aspect, when the rank R=1, U=[1 1 1 1]$^T$, and therefore, D(k)*U may degenerate to transmit diversity (Tx diversity). When rank R≥2, D(k)*U represents open-loop MIMO (OL MIMO). An example may be presented below:

$$D(k) = \text{diag}\{1, e^{-j2\pi kd}, e^{-j2\pi k2d}, e^{-j2\pi k3d}\} \quad (4)$$

$$D(k)U = \begin{bmatrix} 1 \\ e^{-j2\pi kd} \\ e^{-j2\pi k2d} \\ e^{-j2\pi k3d} \end{bmatrix};$$

when R=1 (e.g., TX diversity):

$$U = \begin{bmatrix} 1 \\ 1 \\ 1 \\ 1 \end{bmatrix},$$

and D(k)*U may degenerate to TX diversity:
when R=2 (e.g., OL MIMO):

$$U = \begin{bmatrix} 1 & 1 \\ 1 & -1 \\ 1 & 1 \\ 1 & -1 \end{bmatrix},$$

and D(k)*U may represent OL MIMO:

$$D(k)U = \begin{bmatrix} 1 & 1 \\ e^{-j2\pi kd} & -e^{-j2\pi kd} \\ e^{-j2\pi k2d} & e^{-j2\pi kd} \\ e^{-j2\pi k3d} & -e^{-j2\pi kd} \end{bmatrix}$$

As the above example demonstrates, the described SCDD scheme may achieve full diversity for each layer v and may lead to even channel quality across all layers.

In the above example, in an aspect, the SCDD may be applied to control channel transmission (e.g., PDCCH, PUCCH, or PBCH) and the associated RS (e.g. CRS or DMRS). When the rank R=1, the SCDD may be used for precoding control channels with transmit diversity. In another aspect, the SCDD may be applied to data channel transmissions (e.g., physical downlink shared channel (PDSCH) and/or physical uplink shared channel (PUSCH)) and the associated RS (e.g., DMRS, or UE-specific RS (UERS)). When the rank R=1, the SCDD may be used for precoding data channels with transmit diversity. When the rank R=2 or a bigger number, the SCDD may be used for precoding data signals with open-loop MIMO. In an aspect, DMRS may be precoded in the same way as a data channel, may use any rank R (e.g., rank 1 or rank 2 or higher), or may use R DMRS ports (R is the rank, e.g., if R=2, the DMRS may use two DMRS ports). In an aspect, the UE may directly estimate H*W*D(k)*U using wideband channel estimation, where "H" denotes the unprecoded channel matrix and "k" represents the RE index. In an aspect, "d" is a delay value. The precoding changes from tone to tone with SCCD, but by a small amount (e.g., a small delay value). In some examples, the delay value may be chosen to be very small (e.g., 0.1 microseconds or 0.2 microseconds), and is typically much smaller than a cyclic prefix (CP) length, so that the effective delay spread after applying SCDD is still within the CP. In an aspect, the SCDD scheme may be applicable for both downlink and uplink, and both control and data channels. For example, in downlink, the SCDD scheme may be applied to DMRS (or UERS), CRS, or CSI-RS, while in uplink, the SCDD scheme may be applied to DMRS or Sounding Reference Signal (SRS).

In an aspect, CRS may be precoded by SCDD. For example, a base station (e.g., an eNB) may configure only one CRS port. In this case, control channels and/or data channels that use CRS as demodulation phase reference may be precoded by SCDD in the same way. As such, CRS overhead may be reduced and saved by using only one CRS port instead of two or more CRS ports.

In another aspect, DMRS may be precoded by SCDD. For example, PDSCH and/or PUSCH that use(s) DMRS as demodulation phase reference may be precoded by SCDD in the same way. In this case, the system may use one or multiple DMRS ports.

In an aspect, CSI-RS may be precoded by the precoding matrix W but without SCDD applied. In this case, the UE may apply D(k) and/or U value(s) to generate a rank indicator (RI) and/or a channel quality indicator (CQI).

In another aspect, CSI-RS may be unprecoded. In this case, the UE may apply W, D(i), and U on an estimated channel to derive CSI. In an aspect, the UE may evaluate the derived CSIs and/or several W hypothesis, and feedback the best W to the network (e.g., an eNB).

In an aspect, CSI-RS may be precoded by both W and SCDD. In this case, a base station (e.g., an eNB) may apply an equation W*D(k)*U or Equation (3) on the CSI-RS, and the UE may directly estimate the precoded channel to generate one or more CQIs.

In an aspect, when the CSI-RS is unprecoded or precoded by the precoding matrix W, the CSI may be generated based on a certain delay assumption at the UE as follows. The delay value may be predefined (e.g., in 3GPP standards), may be a semi-static configuration, or dynamically signaled from the network (e.g., from an eNB). In an aspect, the network (e.g. an eNB) may configure or provide (e.g., by transmitting) multiple candidate delay values (e.g., 0.1 microseconds to 0.2 microseconds), and the UE may choose the best delay value and feedback to the network (e.g., an eNB). In another aspect, when the CSI-RS is precoded by SCDD, the delay value may be very small (e.g., several microseconds or less than 1 microsecond).

In some aspects, SRS may be unprecoded or precoded. In an aspect, SRS may be precoded by SCDD. For example, a delay value of SCDD may be predefined (e.g., in 3GPP standards), may be a semi-static configuration, may be determined by the UE, or dynamically signaled from the network (e.g., from an eNB). In an aspect, the network (e.g. an eNB) may configure or provide (e.g., by transmitting) multiple candidate delay values, and the UE may choose the best delay value and feedback to the network (e.g., an eNB).

In an aspect, the network (e.g. an eNB) may choose a delay value to be used for downlink (DL) transmissions with SCDD. The DL transmissions may include a control signal, a data signal, and/or various RS (e.g., DMRS, VERS, CRS, or CSI-RS). In an example, the network (e.g., an eNB) may choose the delay value based on one or more observed uplink (UL) channels (e.g. SRS). In some implementations, for example, channel reciprocity may be held in a time-division duplexing (TDD) system, and the observed UL channel may be used for the network (e.g., in the TDD system) to choose a proper delay value to be used for DL transmissions with SCDD. In some examples, the network (e.g. an eNB) may choose an SCDD delay value based on a CSI feedback or a recommendation from a UE.

In another aspect, the UE may choose a delay value to be used for UL transmissions with SCDD. The UL transmissions may include a control signal, a data signal, and/or various RS (e.g., DMRS, or SRS). In an example, the UE may choose the delay value based on one or more observed DL channels (e.g. CRS, or CSI-RS).

In an aspect, a wireless communication system (e.g., an LTE system) may use a combination of SFBC and FSTD (SFBC-FSTD). For example, for SFBC-FSTD that is used in LTE, on even subcarriers, signal is transmitted over two antenna ports (e.g., ports {0,1}) via SFBC, while the other two ports (e.g., ports {2,3}) are idle. On the other hand, on odd subcarriers, signal is transmitted over two antenna ports {2,3} via SFBC, while ports {0,1} are idle. Therefore, totally four (4) RS ports may be used for SFBC-FSTD.

In an aspect, SCDD may be used for transmit diversity scheme in case of four transmit antenna ports. For example, when SCDD is over four antenna ports, as discussed above, Ntx, the number of transmit antenna, is equal to four (4). In this case, the results y, as shown below in Equation (5), may be virtualized into one layer, and may only use one RS port $$y = HD(k)Ux = H \begin{bmatrix} 1 \\ e^{-j2\pi kd} \\ e^{-j2\pi k2d} \\ e^{-j2\pi k3d} \end{bmatrix} x \quad (5)$$

In another aspect, Hybrid SCDD and SFBC scheme may be used for transmit diversity scheme in case of four transmit antenna ports. For example, SCDD in Rank 2 may be applied and may result in virtualization into two layers, and SFBC may be applied over the resulting two layers. See, e.g., block 902 and block 904 of flowchart in FIG. 9A. In this case, totally two (2) RS ports may be needed and used. In an example, the Hybrid SCDD and SFBC scheme may be present by Equation (6):

$$y = HD(k)U\begin{bmatrix} x_0 \\ x_1 \end{bmatrix} = H \begin{bmatrix} 1 & 1 \\ e^{-j2\pi kd} & -e^{-j2\pi kd} \\ e^{-j2\pi k2d} & e^{-j2\pi kd} \\ e^{-j2\pi k3d} & -e^{-j2\pi kd} \end{bmatrix} \begin{bmatrix} x_0 \\ x_1 \end{bmatrix}, \quad (6)$$

where $$\begin{bmatrix} x_0 \\ x_1 \end{bmatrix}$$

is an Alamouti encoded pair.

In another example of Hybrid SCDD and SFBC scheme used in case of four transmit antenna ports, the SCDD may be applied by applying D(k), and the four antennas are grouped into two antenna groups. In an aspect, the SFBC may be applied over the resulting two ports. See, e.g., block 922, block 924, and block 926 of flowchart in FIG. 9B. In this case, totally two (2) RS ports may be needed and used. In an example, this Hybrid SCDD and SFBC scheme may be present by Equation (7):

$$y = HD(k)A\begin{bmatrix} x_0 \\ x_1 \end{bmatrix} = H \operatorname{diag}\{1, e^{-j2\pi kd}, e^{-j2\pi k2d}, e^{-j2\pi k3d}\} \begin{bmatrix} 1 & 0 \\ 0 & 1 \\ 1 & 0 \\ 0 & 1 \end{bmatrix} \begin{bmatrix} x_0 \\ x_1 \end{bmatrix}, \quad (7)$$

where $$\begin{bmatrix} x_0 \\ x_1 \end{bmatrix}$$

is an Alamouti encoded pair.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a small cyclic delay diversity (SCDD) component 302 configured to perform, e.g., rank determination, precoding a reference signal, and/or one or more SCDD operations for communicating with one or more UEs 115. Similarly, one or more of UEs 115 may include a similar SCDD component 361 configured to perform, e.g., rank determination, precoding a reference signal, and/or one or more SCDD operations in communicate with one or more access points 105. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, an eNodeB, an eNB, a Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, at least a portion of the wireless communications system 100 may be configured to operate on a spatial multiplexing (e.g., MIMO) scheme in which one or more of the UEs 115 and one or more of the access points 105 may be configured to support transmissions on closed loop MIMO and/or open-loop MIMO scheme. In some examples, the one or more UEs 115 and/or the one or more access points 105 may perform large delay CDD (LCDD) or small delay CDD (SCDD) operations when the system is using an open-loop MIMO scheme.

In network communication systems using LTE/LTE-A, 5G New Radio, or similar communication technologies, the terms evolved Node B (eNodeB or eNB) may be used to describe the access points 105, though concepts described herein may be applied to other types of access points in other types of communication technologies (e.g., 5G New Radio). For example, the wireless communications system 100 may be a 5G NR network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). A base station (e.g., an eNB) for a macro cell may be referred to as a macro base station. A base station (e.g., an eNB) for a small cell may be referred to as a small cell base station. A base station (e.g., an eNB) may support one or multiple (e.g., two, three, four, and the like) cells.

The core network 130 may communicate with the base stations or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130).

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro base stations, small cell base stations, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. The MIMO techniques may include closed-loop MIMO and/or open-loop MIMO scheme, and in some examples, the one or more UEs 115 and/or the one or more access points 105 may perform large delay CDD (LCDD) or small delay CDD (SCDD) when the system is using open-loop MIMO scheme. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

Figure 2:
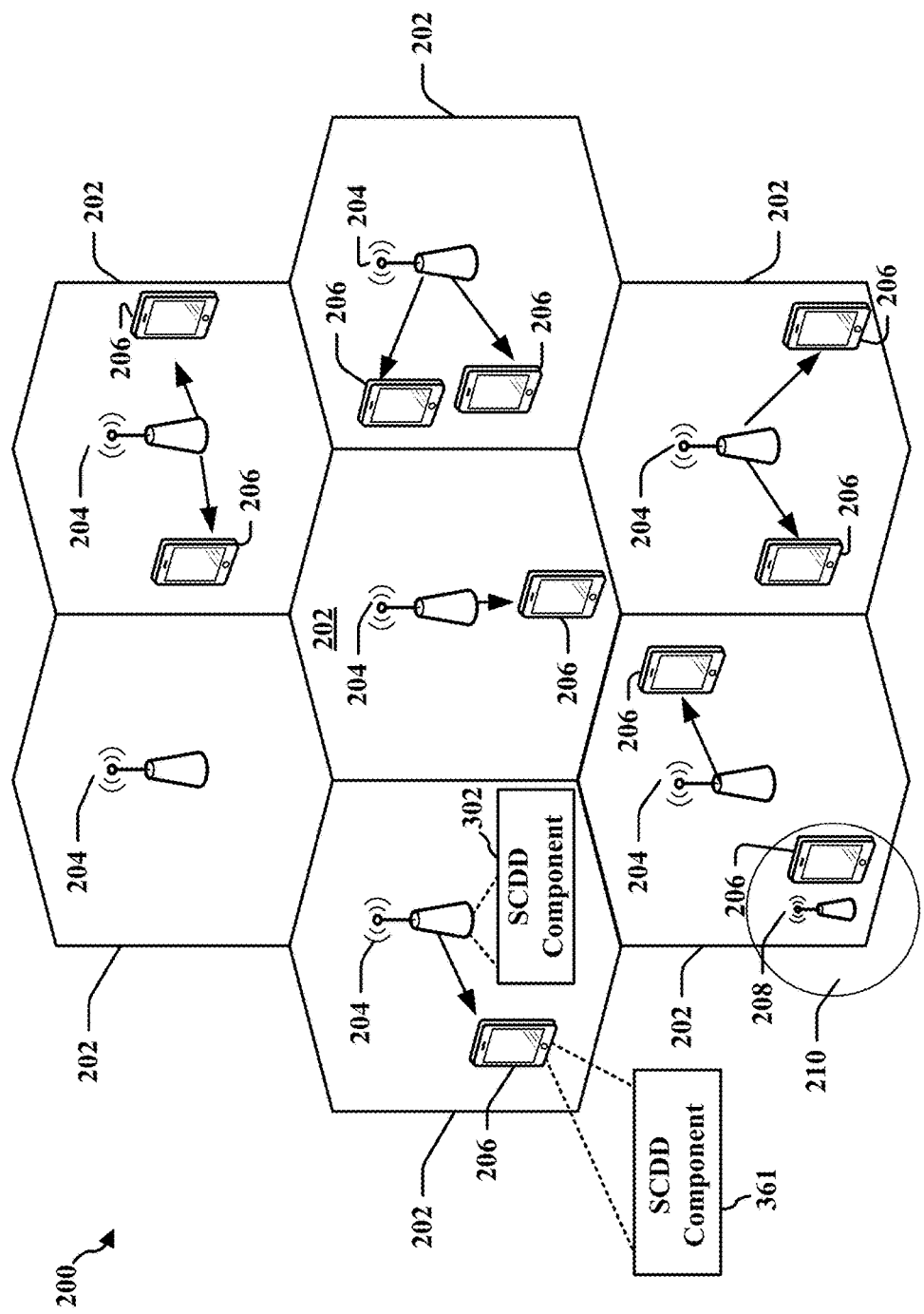
FIG. 2 is a diagram of an example of an access network, in accordance with one or more aspects described herein.

FIG. 2 is a diagram illustrating an example of an access network 200 in a communication network (e.g., a 5G NR or an LTE) architecture. In this example, the access network 200 is divided into a number of cellular regions (cells) 202. One or more small cell base stations 208 may have cellular regions 210 that overlap with one or more of the cells 202. The small cell base stations 208 may provide one or more cells of a lower power class, such as a femto cell (e.g., home eNB (HeNB)), pico cell, micro cell, or remote radio head (RRH). The macro base stations 204 are each assigned to a respective cell 202 and are configured to provide an access point to the core network 130 for all the UEs 206 in the cells 202. In an aspect, base stations 204 and/or 208 may include an SCDD component 302 configured to perform one or more SCDD operations (e.g., rank determination or precoding a reference signal) for communicating with one or more UEs 206. Similarly, one or more of UEs 206 may include an SCDD component 361 configured to perform, e.g., rank determination, precoding a reference signal, and/or one or more SCDD operations for communicating with one or more base stations 204 and/or 208. There may be no centralized controller in this example of an access network 200, but a centralized controller may be used in alternative configurations. The base stations 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE applications, OFDM may be used on the downlink (DL) and SC-FDMA may be used on the uplink (UL) to support both frequency division duplexing (FDD) and time division duplexing (TDD). As those skilled in the art will readily appreciate from the detailed description to follow, the various concepts presented herein may be used for LTE/LTE-A and 5G NR applications. However, these concepts may be readily extended to other telecommunication standards or systems employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The 5th Generation (5G) New Radio (NR) communications technology, used in a wide range of spectrum, is envisaged to expand and support diverse usage scenarios and applications with respect to current and future wireless communication standards. In an aspect, 5G communications technology may use techniques for advanced beamforming and MIMO antenna, and efficient waveform modulation and coding schemes.

The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base station 204 (e.g., eNB 204) to identify the source of each spatially precoded data stream.

In an aspect, the access network 200 may use a specific type or types of transmit diversity. For example, space-time block codes (STBC), space-frequency block codes (SFBC), or a combination of SFBC and frequency switched transmit diversity (FSTD), SFBC-FSTD, may be used. In some examples, small delay CDD (SCDD) may be used as a transmit diversity scheme. In an aspect, by precoding RS and control or data signals, using SCDD for transmit diversity may use one RS port transmission, as compared to two RS ports used for SFBC/STBC, which may result in RS overhead saving and/or better channel estimation.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
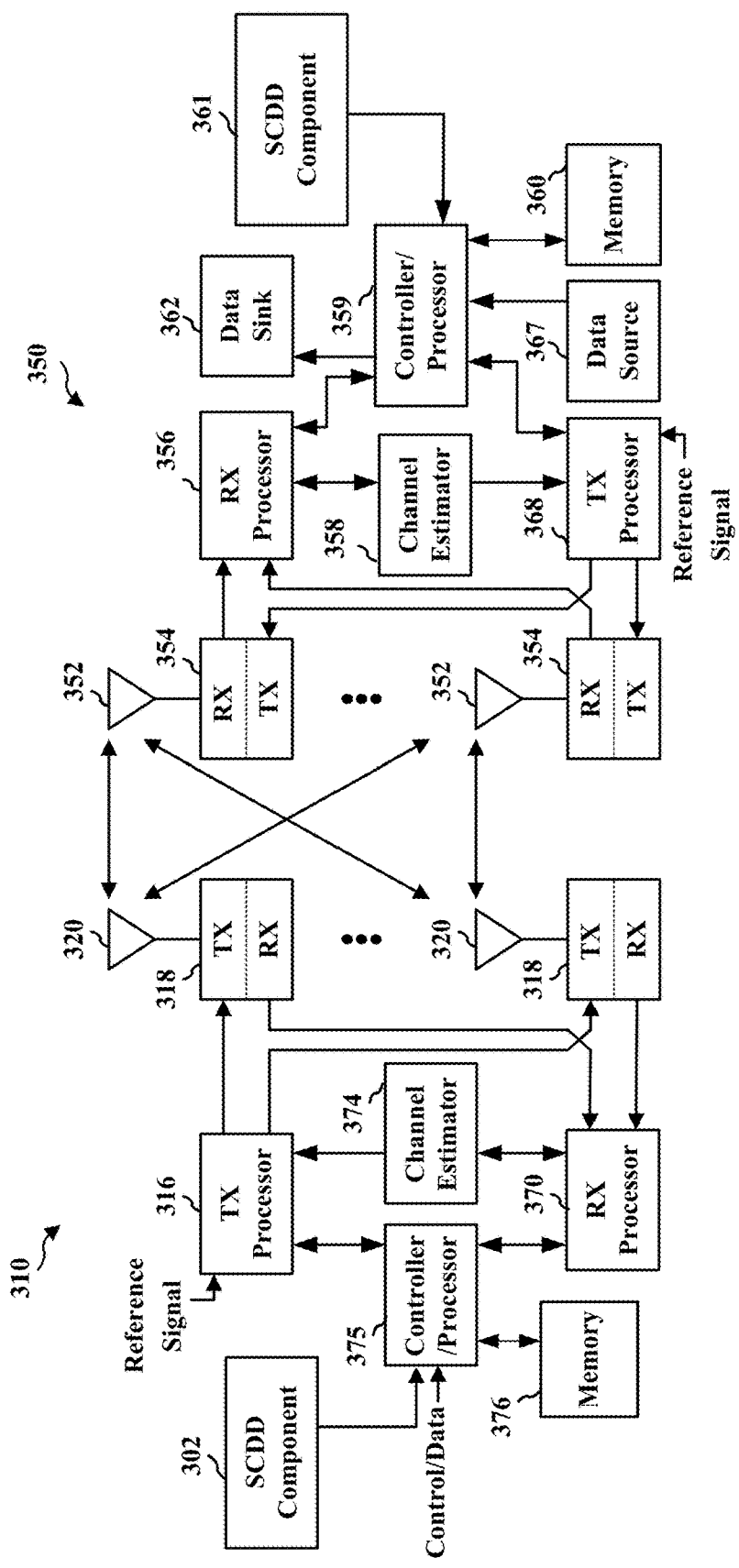
FIG. 3 is a diagram of an example of an evolved Node B and a user equipment in a communications system, in accordance with one or more aspects described herein.

FIG. 3 is a block diagram of a base station (e.g., eNB 310) in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include an SCDD component 302 configured to perform one or more SCDD related operations for communicating with UE 350. Though SCDD component 302 is shown as coupled with controller/processor 375, substantially any processor of an eNB 310 can provide the functions of the SCDD component 302 and/or its related components described herein (e.g., in conjunction with controller/processor 375, memory 376, or otherwise). For example, TX processor 316 and/or RX processor 370 can additionally or alternatively provide one or more functions of SCDD component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include an SCDD component 361 configured to perform one or more SCDD related operations for communicating with one or more eNBs 310. Though SCDD component 361 is shown as coupled with controller/processor 359, substantially any processor of a UE 350 can provide the functions of the SCDD component 361 and/or its related components described herein (e.g., in conjunction with controller/processor 359, memory 360, or otherwise). For example, TX processor 368 and/or RX processor 356 can additionally or alternatively provide one or more functions of SCDD component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
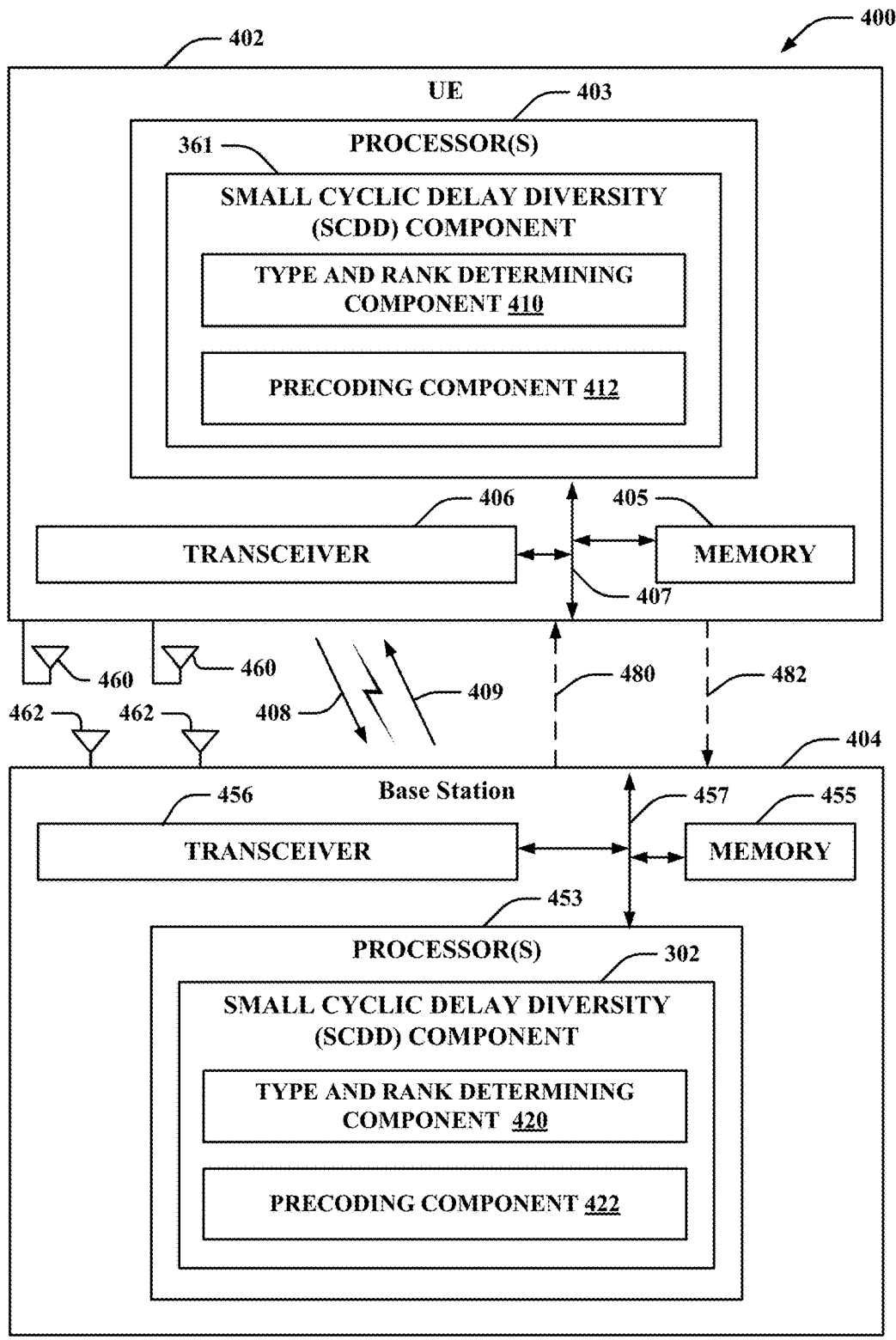
FIG. 4 is a diagram of an example of a communications system using small cyclic delay diversity (SCDD) precoding operations in accordance with one or more aspects described herein.

FIG. 4 illustrates an example of a system 800 using small cyclic delay diversity (SCDD). System 400 includes a UE 402 that communicates with an eNB 404 to access a wireless network, examples of which are described in FIGS. 1-3 (e.g., access points 105, eNB 204, small cell eNB 208, eNB 310, UEs 115, 206, 350, etc.), above. In an aspect, eNB 404 and UE 402 may have established one or more downlink channels over which to communicate via downlink signals 409, which can be transmitted by eNB 404 (e.g., via transceiver 456) and received by UE 402 (e.g., via transceiver 406) for communicating control and/or data messages (e.g., in signaling) from the eNB 404 to the UE 402 over configured communication resources. Moreover, for example, eNB 404 and UE 402 may have established one or more uplink channels over which to communicate via uplink signals 408, which can be transmitted by UE 402 (e.g., via transceiver 406) and received by eNB 404 (e.g., via transceiver 456) for communicating control and/or data messages (e.g., in signaling) from the UE 402 to the eNB 404 over configured communication resources. As described further herein, for example, eNB 404 may communicate a configuration 480 related to SCDD operations for communicating with UE 402 and/or other UEs in multiple connectivity. UE 402 may accordingly communicate feedback 482 to eNB 404.

In an aspect, UE 402 may include one or more processors 403 and/or a memory 405 that may be communicatively coupled, e.g., via one or more buses 407, and may operate in conjunction with or otherwise implement an SCDD component 361 for performing, e.g., rank determination, precoding a reference signal, and/or one or more SCDD operations for communicating with one or more eNBs. For example, the various operations related to SCDD component 361 may be implemented or otherwise executed by one or more processors 403 and, in an aspect, can be executed by a single processor, while in other aspects, different ones of the operations may be executed by a combination of two or more different processors.

For example, in an aspect, the one or more processors 403 may include any one or any combination of a modem processor, or a baseband processor, or a digital signal processor, or an application specific integrated circuit (ASIC), or a transmit processor, receive processor, or a transceiver processor associated with transceiver 406. Further, for example, the memory 405 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 403. Moreover, memory 405 or computer-readable storage medium may be resident in the one or more processors 403, external to the one or more processors 403, distributed across multiple entities including the one or more processors 403, etc.

In particular, the one or more processors 403 and/or memory 405 may execute actions or operations defined by SCDD component 361 or its subcomponents. For instance, the one or more processors 403 and/or memory 405 may execute actions or operations defined by a type and rank determining component 410. In an aspect, for example, type and rank determining component 410 may configured to identify or determine a type of information for transmission and/or a rank associated with the type of information. The type and rank determining component 410 may include hardware (e.g., one or more processor modules of the one or more processors 403) and/or computer-readable code or instructions stored in memory 405 and executable by at least one of the one or more processors 403 to perform the SCDD related operations described herein. Further, for instance, the one or more processors 403 and/or memory 405 may execute actions or operations defined by a precoding component 412. In an aspect, for example, the precoding component 412 may include hardware (e.g., one or more processor modules of the one or more processors 403) and/or computer-readable code or instructions stored in memory 405 and executable by at least one of the one or more processors 403 to perform the SCDD related operations described herein.

Similarly, in an aspect, eNB 404 may include one or more processors 453 and/or a memory 455 that may be communicatively coupled, e.g., via one or more buses 457, and may operate in conjunction with or otherwise implement an SCDD component 302 for performing, e.g., rank determination, precoding a reference signal, and/or one or more SCDD operations for communicating with one or more UEs, such as UE 402. For example, the various functions related to SCDD component 302 may be implemented or otherwise executed by one or more processors 453 and, in an aspect, can be executed by a single processor, while in other aspects, different ones of the functions may be executed by a combination of two or more different processors, as described above. In one example, the one or more processors 453 and/or memory 455 may be configured as described in examples above with respect to the one or more processors 403 and/or memory 405 of UE 402.

In an example, the one or more processors 453 and/or memory 455 may execute actions or operations defined by SCDD component 302 or its subcomponents. For instance, the one or more processors 453 and/or memory 455 may execute actions or operations defined by a type and rank determining component 420 for identifying a type of information for transmission and/or a rank associated with the type of information for communicating in a wireless network. In an aspect, for example, type and rank determining component 420 may include hardware (e.g., one or more processor modules of the one or more processors 453) and/or computer-readable code or instructions stored in memory 455 and executable by at least one of the one or more processors 453 to perform the SCDD related operations described herein. Further, for instance, the one or more processors 453 and/or memory 455 may execute actions or operations defined by a precoding component 422. In an aspect, for example, precoding component 422 may include hardware (e.g., one or more processor modules of the one or more processors 453) and/or computer-readable code or instructions stored in memory 455 and executable by at least one of the one or more processors 453 to perform the SCDD related operations described herein.

In an example, transceivers 406, 456 may be configured to transmit and receive wireless signals through one or more antennas 460, 462, one or more RF front end components (e.g., a power amplifier, low-noise amplifier, a filter, a digital-to-analog converter, an analog-to-digital converter, etc., not shown), one or more transmitters, one or more receivers, etc. In an aspect, transceivers 406, 456 may be tuned to operate at specified frequencies such that UE 402 and/or eNB 404 can communicate at a certain frequency. In an aspect, the one or more processors 403 may configure transceiver 406 and/or one or more processors 453 may configure transceiver 456 to operate at a specified frequency and power level based on a configuration, a communication protocol, etc. to communicate uplink signals 408 and/or downlink signals 409, respectively, over related uplink or downlink communication channels (e.g., via one or more antennas 460, 462).

In an aspect, transceivers 406, 456 can operate in multiple bands (e.g., using a multiband-multimode modem, not shown) such to process digital data sent and received using transceivers 406, 456. In an aspect, transceivers 406, 456 can be multiband and be configured to support multiple frequency bands for a specific communications protocol. In an aspect, transceivers 406, 456 can be configured to support multiple operating networks and communications protocols. Thus, for example, transceivers 406, 456 may enable transmission and/or reception of signals based on a specified modem configuration.

Figure 5:
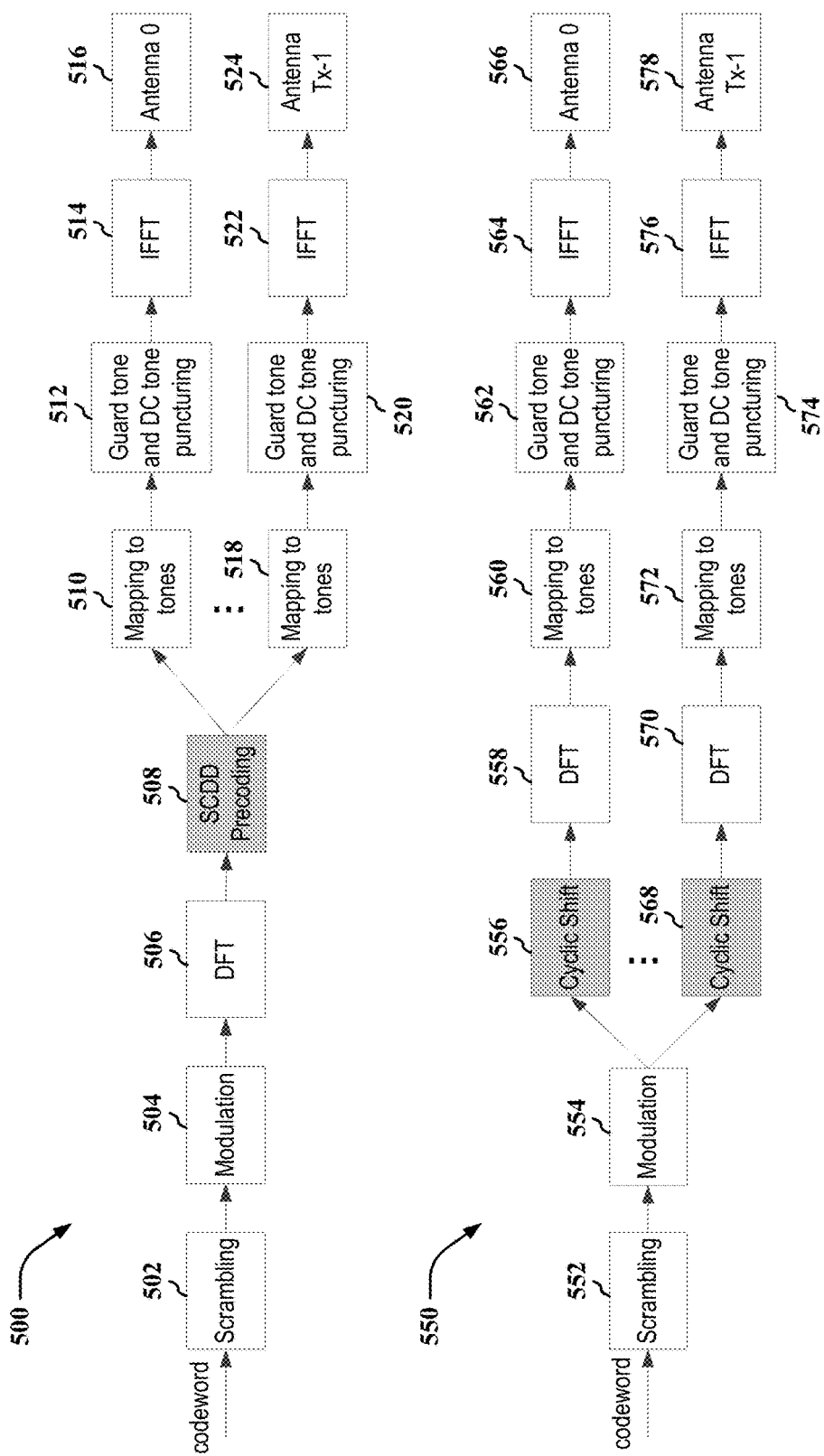
FIG. 5 is a diagram of an example of a communications system using a SCDD precoding operation for discrete Fourier transform (DFT)-spread orthogonal frequency division multiplexing (OFDM) signals, in accordance with one or more aspects described herein.

Referring to FIG. 5, an example of a communications system or device (e.g., UE 402, and/or eNB 404 in FIG. 4) applying SCDD precoding operations for discrete Fourier transform (DFT)-spread orthogonal frequency division multiplexing (OFDM) signals is provided. In an aspect, for DFT-spread OFDM signals, SCDD precoding (e.g., for one or more codewords) may be used or applied after DFT spreading, and before mapping to physical subcarriers. For example, in a block diagram 500, at block 508, an operation of SCDD precoding (e.g., using the SCDD scheme presented by Equation (3), or W*D(k)*U) may be applied or performed after a DFT spreading operation at block 506, where the DFT spreading operation is performed after the communications system or device performs scrambling (at block 502) and modulation (at block 504) for one or more codewords. After the SCDD precoding is performed at block 508, the signal(s) may be mapped to physical subcarriers or tones (e.g., at block 510 and/or block 518) where the subcarriers or tones may be OFDM subcarriers or tones. Then, after the tone mappings, the communication system or device may be configured to perform guard tone and DC tone puncturing (e.g., at block 512, and/or block 520), inverse fast Fourier transform (IFFT) (e.g., at block 514, and/or block 522), and send the signal(s) to antenna(s) (e.g., at block 516, and/or block 524) for transmissions.

In another aspect, a block diagram 550 shows another scheme to process codeword(s) in a communications system or device (e.g., UE 402, and/or eNB 404 in FIG. 4), and may have same or similar input(s) and outputs(s) compared with the block diagram 500. The block diagram 550 may include one or more of the following processes for the input codeword(s): scrambling (at block 552), modulation (at block 554), one or more cyclic shifts (e.g., at block 556 and/or block 568), DFT (e.g., at block 558, and/or block 570), mapping to subcarriers/tones (e.g., at block 560, and/or block 572), guard tone and DC tone puncturing (e.g., at block 562, and/or block 574), IFFT (e.g., at block 564, and/or block 576), and sending the processed codeword(s) or signal(s) to antenna(s) (e.g., at block 566, and/or block 578) for transmissions.

In an aspect, for DFT-spread OFDM signals, performing SCDD precoding, after DFT spreading and before mapping (e.g., one or more codewords) to physical subcarriers/tones, may be equivalent to cyclically shifting the time domain samples prior to DFT. For example, the SCDD precoding performed at block 508 in the block diagram 500 may be equivalent or similar to cyclic shift(s) (e.g., at block 556 and/or block 568) in the block diagram 550, before performing DFT (e.g., at block 558 and/or 570).

Figure 6:
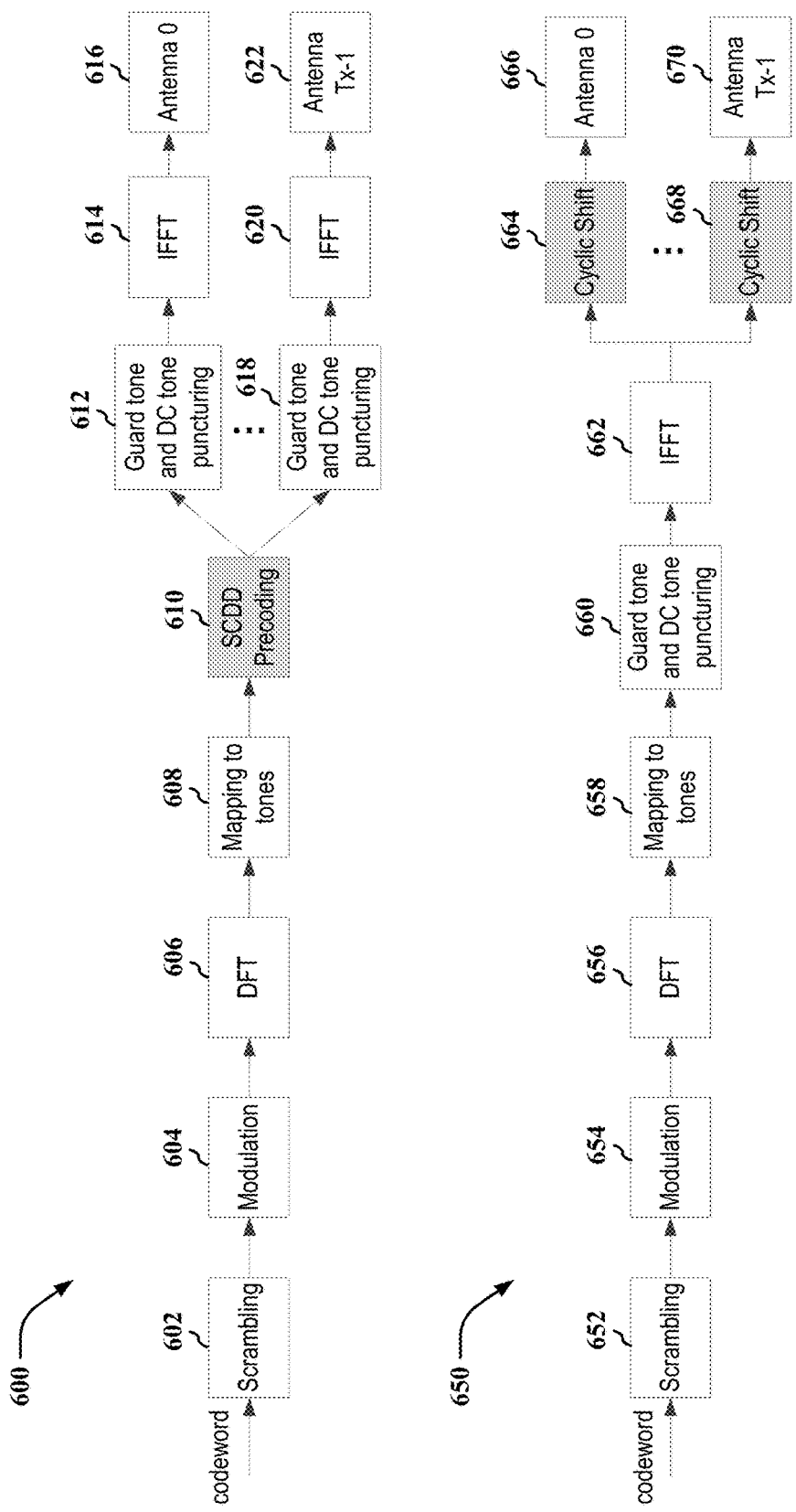
FIG. 6 is a diagram of another example of a communications system using a SCDD precoding operation for DFT-spread OFDM signals, in accordance with one or more aspects described herein.

Referring to FIG. 6, another example of a communications system or device (e.g., UE 402, and/or eNB 404 in FIG. 4) applying SCDD precoding operations for DFT-spread OFDM signals is provided. In an aspect of a block diagram 600, the communications system or device may perform scrambling (at block 602) and modulation (at block 604) for one or more codewords. In some examples, SCDD precoding (e.g., for one or more codewords) may be used or applied after DFT spreading, and after mapping (e.g., one or more codewords) to physical subcarriers. For example, in the block diagram 600, at block 610, an operation of SCDD precoding (e.g., using the SCDD scheme presented by Equation (3), or W*D(k)*U) may be applied or performed after a DFT spreading operation at block 606, and after the codeword(s) being mapped to physical subcarriers or tones at block 608, where the subcarriers or tones may be OFDM subcarriers or tones. After the SCDD precoding is performed at block 610, the communication system or device may be configured to perform one or more of guard tone and DC tone puncturing (e.g., at block 612, and/or block 618), IFFT (e.g., at block 614, and/or block 620), and send the codeword(s) or signal(s) to antenna(s) (e.g., at block 616, and/or block 622) for transmissions.

In another aspect, a block diagram 650 shows another scheme to process codeword(s) in a communications system or device (e.g., UE 402, and/or eNB 404 in FIG. 4), and may have same or similar input(s) and outputs(s) compared with the block diagram 600. The block diagram 650 may include one or more of the following processes for the input codeword(s): scrambling (at block 652), modulation (at block 654), DFT (at block 656), mapping to subcarriers/tones (at block 658), guard tone and DC tone puncturing (at block 660), IFFT (at block 662), one or more cyclic shifts (e.g., at block 664, and/or block 668), and sending the processed codeword(s) or signal(s) to antenna(s) (e.g., at block 666, and/or block 670) for transmissions.

In an aspect, for DFT-spread OFDM signals, performing SCDD precoding (e.g., for one or more codewords) after DFT spreading and after mapping (e.g., one or more codewords) to physical subcarriers/tones may be equivalent to cyclically shifting the time domain samples after IFFT. For example, the SCDD precoding performed at block 610 in the block diagram 600 may be equivalent or similar to cyclic shift(s) (e.g., at block 664, and/or block 668) in the block diagram 650, after performing IFFT at block 662.

In some implementations, the two example schemes discussed above of applying SCDD precoding operations for DFT-spread OFDM signals may be equivalent or different. In particular, one example scheme is shown in the block diagram 500 in FIG. 5, which includes performing SCDD precoding after DFT spreading and before mapping (e.g., one or more codewords) to physical subcarriers/tones. The other example scheme is shown in the block diagram 600 in FIG. 6, which includes performing SCDD precoding after DFT spreading and after mapping (e.g., one or more codewords) to physical subcarriers/tones.

In an aspect, the two schemes may be equivalent for single-carrier waveforms or signals, such as localized frequency division multiple access (LFDMA) or interleaved frequency division multiple access (IFDMA) signals. In another aspect, the two schemes may be different in general. For example, for interleaved resource block (RB) allocations (e.g., defined in licensed-assisted access (LAA) physical uplink control channel (PUCCH)), the two schemes may be different.

While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 7:
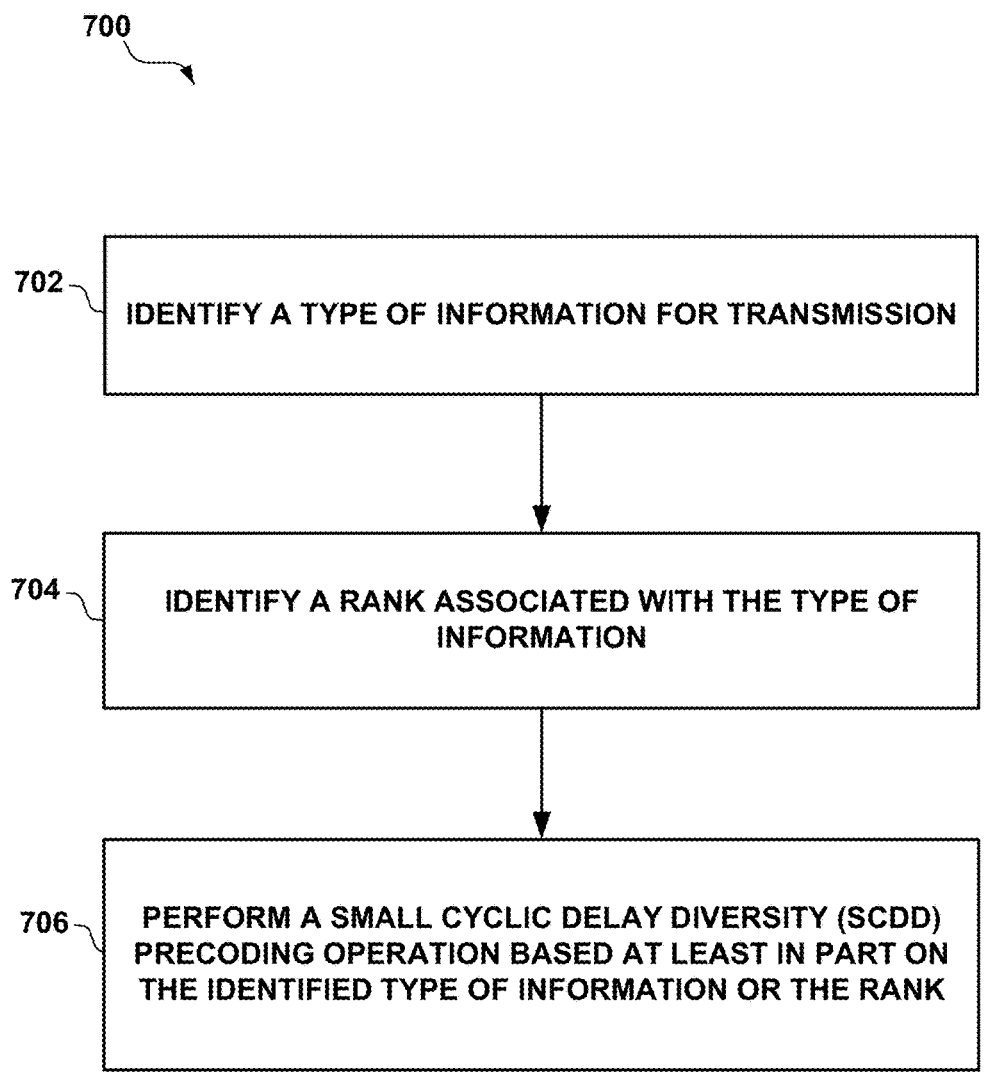
FIG. 7 is a flowchart of an example method for SCDD precoding operations in accordance with one or more aspects described herein.

Referring to FIG. 7, in an operational aspect, a UE (e.g., UE 115 in FIG. 1 or UE 402 in FIG. 4) or a network entity (e.g., access point/base station 105 in FIG. 1 or base station 404 in FIG. 4) may perform one aspect of a method 700 for one or more SCDD-based operations. At block 702, the method 700 may include identifying a type of information for wireless transmissions. In an aspect, the process of identifying may involve one or more operations (e.g., determining, calculating) in which the type of information is determined. In an aspect, for example, type and rank determining component 410/420 (FIG. 4), e.g., in conjunction with processor(s) 403/453, memory 405/455, and/or transceiver 406/456, may identify a type of information or signal for transmission. For example, the type of information or signal may include, but not limited to, reference signals, control information, or data.

At block 704, the method 700 may include identifying a rank associated with the type of information. In an aspect, the process of identifying may involve one or more operations (e.g., determining, calculating) in which the rank is determined or calculated. In an aspect, type and rank determining component 410/420 (FIG. 4), e.g., in conjunction with processor(s) 403/453, memory 405/455, and/or transceiver 406/456, may identify a rank associated with the type of information. For example, when the rank is identified or determined to be one (1), SCDD component 361 may operate or apply a transmit diversity scheme. In another example, when the rank is identified or determined to be two (2) or lower (i.e., the number is larger than 2, or R≥2), SCDD component 361 may operate or apply open-loop MIMO using precoder cycling.

At block 706, the method 700 may include performing a small cyclic delay diversity (SCDD) precoding operation based at least in part on the identified type of information or the rank. In an aspect, for example, the SCDD component 361/302 (FIGS. 3 and 4), the precoding component 412/422, e.g., in conjunction with processor(s) 403/453, memory 405/455, and/or transceiver 406/456, may perform an SCDD precoding operation. For example, the SCDD precoding operation may include precoding a reference signal (e.g., a CRS, a DMRS, a CSI-RS, or an SRS) or a control/data signal, enabling wideband channel estimation, or using hybrid SCDD and space-frequency block codes (SFBC).

In another aspect of the method 700, performing the SCDD precoding operation may be represented by y=W*D(k)*Ux (e.g., in Equation (3)), wherein W is a fixed precoding matrix, D(k) is a tone-dependent cyclic delay matrix where k is an RE index, and Ux is a discrete Fourier transform (DFT) matrix.

In another aspect of the method 700, the type of information may include a reference signal, control information, or data. In an aspect, for example, the type and rank determining component 410/420 may be configured to provide or identify the type of information or signal (e.g., a reference signal, control information, or data) for transmissions.

In an aspect of the method 700, performing the SCDD precoding operation at block 706 may include precoding one or more reference signals in a same way as precoding data signal(s). In an aspect, for example, the SCDD component 361/302, and/or the precoding component 412/422 may be configured to precode one or more reference signals (e.g., DMRS) and data signal(s) using a same SCDD scheme. For example, a reference signal (e.g., DMRS) may be precoded in the same way as a data channel, may use R DMRS ports (R is the rank, e.g., if R=2, the DMRS may use two DMRS ports). In an aspect, the UE may directly estimate H*W*D(k)*U (e.g., using wideband channel estimation), where "H" denotes the unprecoded channel matrix and "k" represents the RE index.

In another aspect of the method 700, performing the SCDD precoding operation at block 706 may include enabling or using wideband channel estimation. In an aspect, for example, the SCDD component 361/302, the precoding component 412/422, e.g., in conjunction with processor(s)

403/453, memory 405/455, and/or transceiver 406/456, may be configured to enable or perform wideband channel estimation.

In an aspect of the method 700, performing the SCDD precoding operation at block 706 may include precoding a cell-specific reference signal (CRS), a demodulation reference signal (DMRS), a channel state information reference signal (CSI-RS), or a sounding reference signal (SRS). In an aspect, for example, the SCDD component 361/302, and/or the precoding component 412/422 may be configured to precode a CRS, a DMRS, a CSI-RS, or an SRS.

In another aspect of the method 700, performing the SCDD precoding operation at block 706 may include applying space-frequency block codes (SFBC). In an aspect, for example, the SCDD component 361/302, the precoding component 412/422, e.g., in conjunction with processor(s) 403/453, memory 405/455, and/or transceiver 406/456, may be configured to apply space-frequency block codes (SFBC).

In an aspect of the method 700, the rank may include an indication of transmit diversity or open-loop MIMO. In an aspect, for example, the type and rank determining component 410/420 may be configured to provide or include an indication of transmit diversity or open-loop MIMO.

In another aspect, the method 700 may include transmitting one or more signals in response to performing the SCDD precoding operation. In an aspect, for example, the SCDD component 361/302 in conjunction with transceiver 406/456 may transmit one or more signals in response to the SCDD precoding operation being performed at block 706.

In an aspect, the method 700 may include selecting a MIMO scheme, and selecting an SCDD precoding scheme based on the MIMO scheme and at least a precoding matrix, a cyclic delay matrix, or the identified rank. For example, the SCDD component 361/302, the type and rank determining component 410/420, the precoding component 412/422, e.g., in conjunction with processor(s) 403/453, and/or memory 405/455, may be configured to select a MIMO scheme, and select an SCDD precoding scheme based on the MIMO scheme and at least a precoding matrix, a cyclic delay matrix (or a delay value), or the identified rank. In an example, the SCDD scheme may be presented by "W*D(k)*$U_x$", where W is a precoding matrix, D(k) is a cyclic delay matrix, k is an RE index, and $U_x$ is associated with a rank. In particular, in an example, W may be a fixed (e.g., wideband) precoding matrix, D(k) may be a tone-dependent cyclic delay matrix, k is a resource element (RE) index, and $U_x$ is a discrete Fourier transform (DFT) matrix.

In another aspect of the method 700, performing the SCDD precoding operation at block 706 may be based on the selected SCDD precoding scheme discussed herein. In an aspect, for example, the SCDD component 361/302, the precoding component 412/422, e.g., in conjunction with processor(s) 403/453, memory 405/455, and/or transceiver 406/456, may be configured to perform the SCDD precoding operation based on a selected SCDD precoding scheme.

In another aspect of the method 700, a CSI-RS is not be precoded by the SCDD precoding operation and a network entity either semi-statically or dynamically indicates the cyclic delay value to a UE to be used for SCDD. The UE may then derive the CSI based on assuming the cyclic delay value. The network entity may indicate multiple delay values, and the UE may select the best delay value among the delay values indicated by the network entity and may provide feedback to the network entity with the selection.

In another aspect of the method 700, an SRS is precoded by the SCDD precoding operation and a network entity either semi-statically or dynamically indicates the cyclic delay value to a UE to be used for SCDD. The network entity may indicate multiple delay values, and the UE may select the best delay value among the delay values indicated by the network entity and may provide feedback to the network entity with the selection. Alternatively, the UE may select the delay value without indication from the network entity and may report the selection to the network entity.

In another aspect of the method 700, a network entity indicates to a user equipment (UE) whether or not to precode an SRS. In an aspect, when the SRS is precoded by the SCDD precoding operation, the network entity either semi-statically or dynamically indicates one or more cyclic delay values to the UE, wherein the network entity receives feedback from the UE indicating which of the one or more cyclic delay values is selected by the UE.

In another aspect of the method 700, a user equipment (UE) chooses whether or not to precode an SRS. In an aspect, when the SRS is precoded by the SCDD precoding operation, the UE selects a delay value without indication from a network entity, wherein the network entity receives feedback from the UE indicating the cyclic delay value selected by the UE.

In another aspect of the method 700, the network entity selects or identifies one or more cyclic delay values based on uplink channel sounding (e.g., SRS) or CSI feedback.

In another aspect of the method 700, the network entity selects or identifies one or more cyclic delay values based on a recommendation from the UE.

In another aspect of the method 700, a UE selects a cyclic delay value for uplink SCDD based on downlink channel observations (e.g., CRS, CSI-RS).

In another aspect of the method 700, a UE selects a cyclic delay value for uplink transmissions based on a downlink channel observation, or based on a recommendation from a network entity.

In yet another aspect of the method 700, performing the SCDD precoding operation may include applying SFBC over resulting layers applying an SCDD scheme based on the rank. In one example, the rank is two and there are two resulting layers.

In another aspect of the method 700, performing the SCDD precoding operation may include applying SFBC over resulting ports, grouping antennas into a plurality of antenna groups, and applying a tone-dependent cyclic delay matrix. In one example, four of the antennas are grouped into two of the groups and there are two resulting ports.

Figure 8:
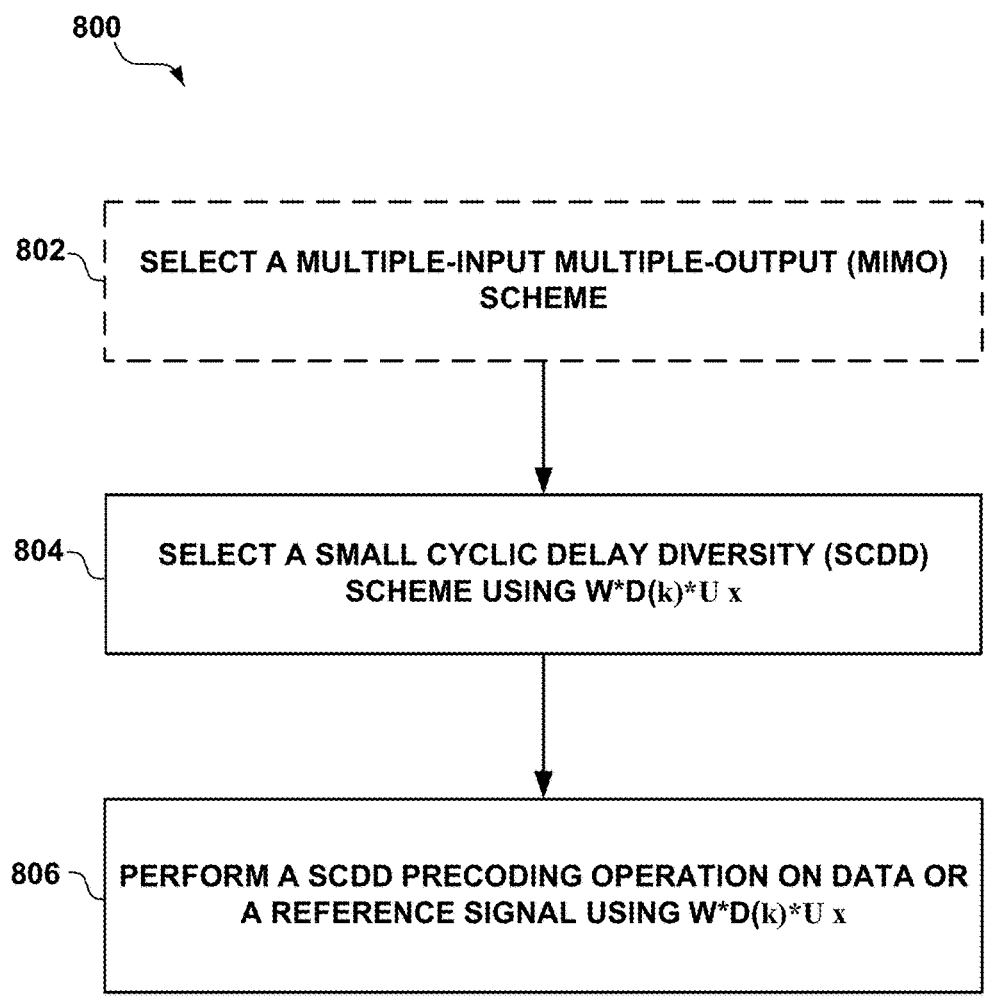
FIG. 8 is a flowchart of another example method for SCDD precoding operations in accordance with one or more aspects described herein.

Referring to FIG. 8, in an operational aspect, a UE (e.g., UE 115 in FIG. 1 and UE 402 of FIG. 4) or a network entity (e.g., access point/base station 105 in FIG. 1 or base station 404 in FIG. 4) may perform one aspect of a method 800 for one or more SCDD-based operations. In method 800, the block indicated as a dashed box may represent optional feature(s).

At block 802, the method 800 may optionally include selecting a multiple-input multiple-output (MIMO) scheme, for example, a closed-loop MIMO scheme or an open-loop MIMO scheme. In an aspect, for example, the SCDD component 361/302, the type and rank determining component 410/420, e.g., in conjunction with processor(s) 403/453, and/or memory 405/455, may be configured to select a MIMO scheme, e.g., a closed-loop MIMO scheme or an open-loop MIMO scheme.

At block 804, the method 800 may include selecting an SCDD scheme. In an aspect, for example, the selected SCDD scheme may use W*D(k)*$U_x$ as discussed herein (e.g., in Equation (3)). In an aspect, for example, the SCDD component 361/302, the precoding component 412/422, e.g., in conjunction with processor(s) 403/453, and/or memory 405/455, may be configured to select an SCDD scheme. In an example, the SCDD scheme may be presented by "W*D(k)*$U_x$", where W is a precoding matrix, D(k) is a cyclic delay matrix, k is an RE index, and $U_x$ is associated with a rank. In particular, in an example, W may be a fixed (e.g., wideband) precoding matrix, D(k) may be a tone-dependent cyclic delay matrix, k is a resource element (RE) index, and $U_x$ is a discrete Fourier transform (DFT) matrix.

At block 806, the method 800 may include performing an SCDD precoding operation on data signals/channels, or a reference signal (RS). In an aspect, for example, performing the SCDD precoding operation may include using W*D(k)*$U_x$ as discussed herein (e.g., in Equation (3)), or using an SCDD scheme selected at block 804. In an aspect, for example, the SCDD component 361/302, or the precoding component 412/422, e.g., in conjunction with processor(s) 403/453, and/or memory 405/455, may be configured to perform an SCDD precoding operation on data signals/channels, or a RS. In an example, the SCDD precoding operation may including applying or using an equation presented by "W*D(k)*$U_x$", where W is a precoding matrix, D(k) is a cyclic delay matrix, k is an RE index, and $U_x$ is associated with a rank. In particular, in an example, W may be a fixed (e.g., wideband) precoding matrix, D(k) may be a tone-dependent cyclic delay matrix, k is a resource element (RE) index, and $U_x$ is a discrete Fourier transform (DFT) matrix. In an aspect, for example, the RS may be a CRS, a DMRS, a CSI-RS, or an SRS.

Figure 9A:
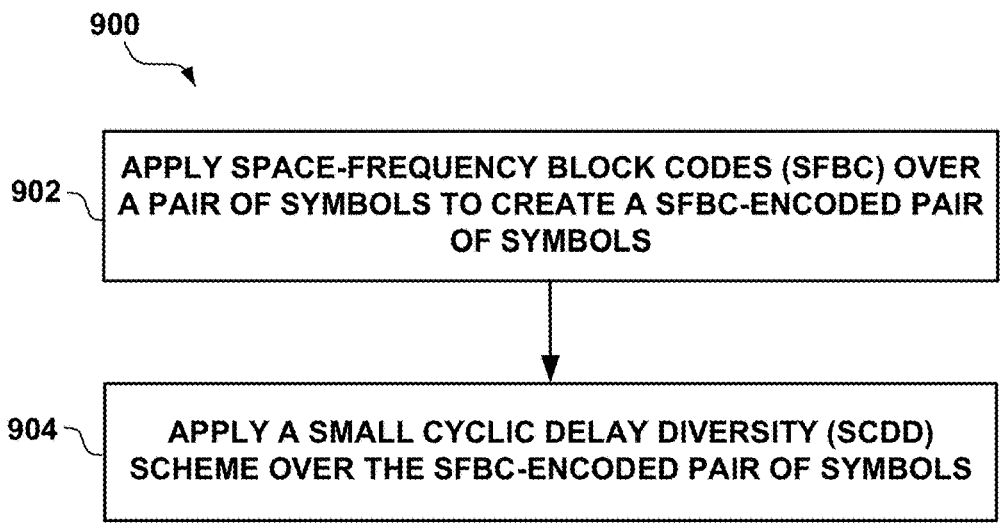
FIG. 9A is a flowchart of an example method for a hybrid scheme using SCDD and space-frequency block codes (SFBC) in accordance with one or more aspects described herein.

Referring to FIG. 9A, in an operational aspect, a UE (e.g., UE 115 in FIG. 1 and UE 402 of FIG. 4) or a network entity (e.g., access point/base station 105 in FIG. 1 or base station 404 in FIG. 4) may perform one or more aspects of a method 900 for one or more hybrid schemes using SCDD and space-frequency block codes (SFBC).

At block 902, the method 900 may include applying space-frequency block codes (SFBC) over a pair of symbols to create a SFBC-encoded pair of symbols. In an aspect, for example, the SCDD component 361/302, the precoding component 412/422, e.g., in conjunction with processor(s) 403/453, memory 405/455, and/or transceiver 406/456, may be configured to use or apply SFBC over a pair of symbols to create a SFBC-encoded pair of symbols.

At block 904, the method 900 may include applying an SCDD scheme (e.g., a rank-2 SCDD scheme) over the SFBC-encoded pair of symbols. In an aspect, for example, the SCDD component 361/302, the type and rank determining component 410/420, e.g., in conjunction with processor(s) 403/453, memory 405/455, and/or transceiver 406/456, may be configured to use, apply or perform an SCDD scheme based on rank-2 over the SFBC-encoded pair of symbols. In an implementation, for example, the rank is two and two layers is used.

In another aspect of the method 900, D(k)U is applied on the channel H, which creates a virtualized 2-port channel HD(k)U. The SFBC pair $$\begin{bmatrix} x_0 \\ x_1 \end{bmatrix}$$

is transmitted over the 2-port channel as HD(k)U $$\begin{bmatrix} x_0 \\ x_1 \end{bmatrix}.$$

In this case, the transmitter may first form the SFBC pair $$\begin{bmatrix} x_0 \\ x_1 \end{bmatrix}$$

and may then apply the SCDD D(k)U, which is then transmitted over the channel H. Accordingly, in method 900, SFBC may be applied over a pair of symbols (block 902), and then an SCDD scheme of rank-2 may be applied over the SFBC-encoded pair of symbols (block 904).

In another aspect of the method 900, the rank may be two, and there are two resulting layers. In an aspect, two RS ports may be used for the one or more hybrid schemes discussed in the method 900.

Figure 9B:
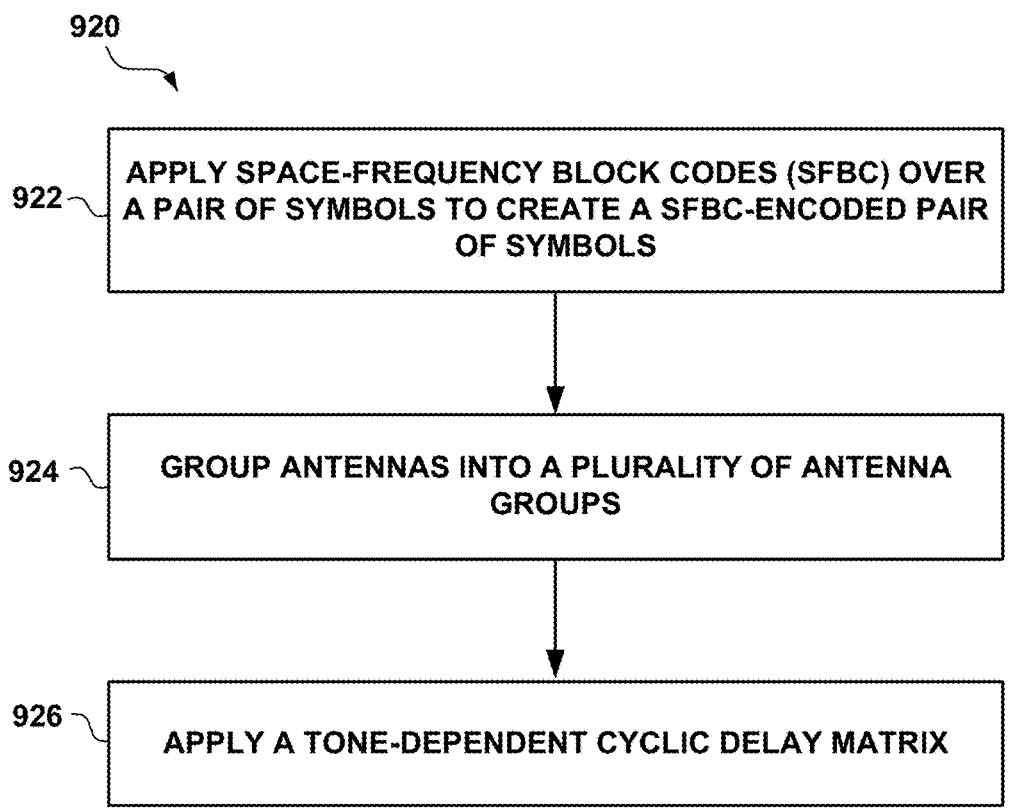
FIG. 9B is a flowchart of another example method for a hybrid scheme using SCDD and SFBC in accordance with one or more aspects described herein.

Referring to FIG. 9B, in another operational aspect, a UE (e.g., UE 115 in FIG. 1 and UE 402 of FIG. 4) or a network entity (e.g., access point/base station 105 in FIG. 1 or base station 404 in FIG. 4) may perform one or more aspects of a method 920 for one or more hybrid schemes using SCDD and SFBC.

At block 922, the method 920 may include applying SFBC over a pair of symbols to create a SFBC-encoded pair of symbols. In an aspect, for example, the SCDD component 361/302, the precoding component 412/422, e.g., in conjunction with processor(s) 403/453, memory 405/455, and/or transceiver 406/456, may be configured to use or apply SFBC over a pair of symbols to create a SFBC-encoded pair of symbols At block 924, the method 920 may include grouping antennas into a plurality of antenna groups (e.g., two antenna groups). In an aspect, for example, the SCDD component 361/302, e.g., in conjunction with processor(s) 403/453, memory 405/455, and/or transceiver 406/456, may be configured to group antennas into one or more antenna groups (e.g., two antenna groups). In an aspect, the pair of SFBC-encoded symbols may be mapped into the antennas of a corresponding antenna group. For example, the first symbol of the SFBC-encoded pair may be mapped to all the antennas in the first antenna group, and the second symbol of the pair of the SFBC-encoded symbols may be mapped to all the antennas of the second antenna group.

At block 926, the method 920 may include applying a tone-dependent cyclic delay matrix. In an aspect, for example, the SCDD component 361/302, the precoding component 412/422, e.g., in conjunction with processor(s) 403/453, memory 405/455, and/or transceiver 406/456, may be configured to use or apply a tone-dependent cyclic delay matrix for SCDD. In an implementation, for example, the tone-dependent cyclic delay matrix may be D(k) in Equation (3) discussed herein, where k is an RE index.

In an example, the method 920 may involve applying SFBC over a pair of symbols (block 922), partition antennas into two groups and assign each of the SFBC-encoded symbols onto the antennas of each antenna group (block 924), and apply SCDD of rank Ntx on each antenna.

In another aspect of the method 920, four of the antennas may be grouped into two of the groups, and there may be two resulting ports.

Figure 10:
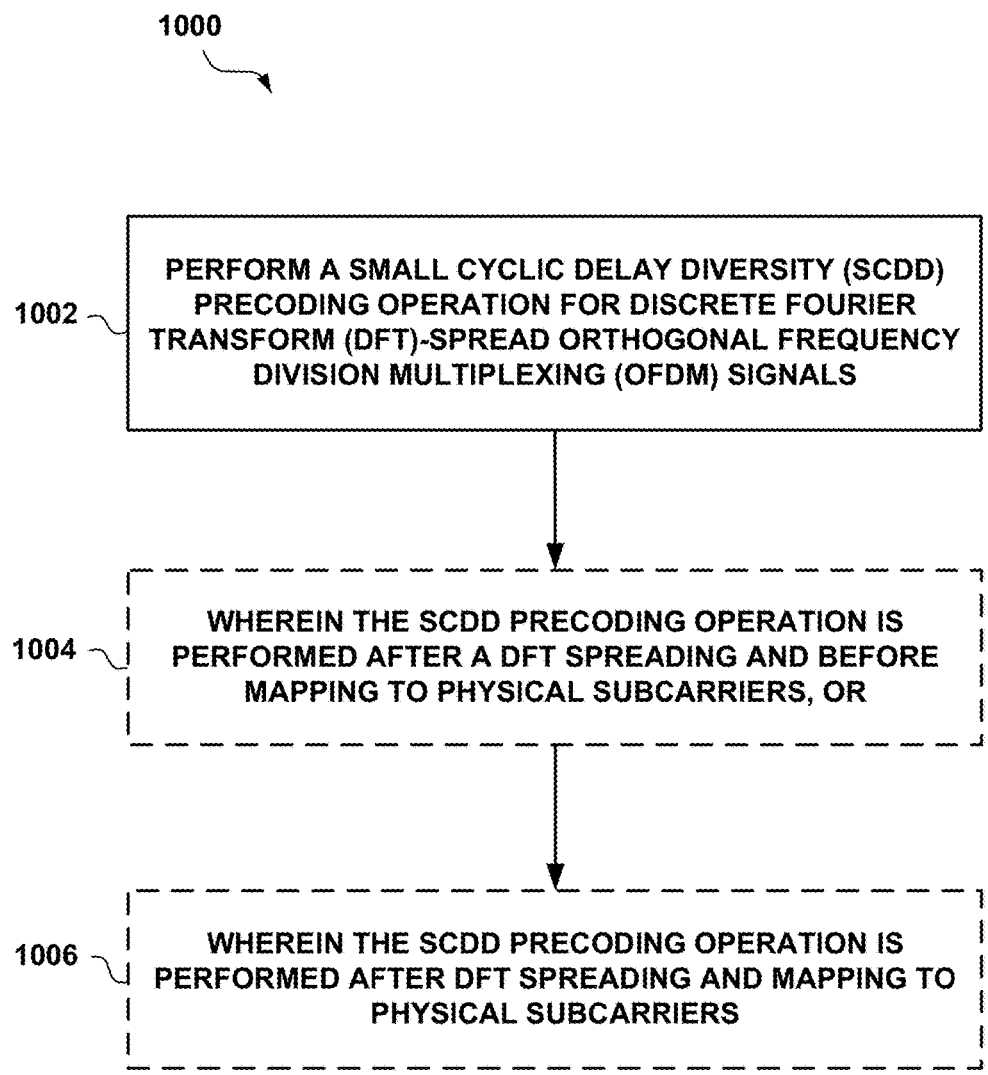
FIG. 10 is a flowchart of an example method of performing SCDD precoding operations for DFT-spread OFDM signals, in accordance with one or more aspects described herein.

Referring to FIG. 10, in an operational aspect, a UE (e.g., UE 115 in FIG. 1 and UE 402 of FIG. 4) or a network entity (e.g., access point/base station 105 in FIG. 1 or base station 404 in FIG. 4) may perform one or more aspects of a method 1000 of SCDD precoding operations for discrete Fourier transform (DFT)-spread orthogonal frequency division multiplexing (OFDM) signals or waveforms. In method 1000, the blocks indicated as dashed boxes may represent optional feature(s).

At block 1002, the method 1000 may include performing an SCDD precoding operation for DFT-spread OFDM signals. In an aspect, for example, the SCDD component 361/302, the precoding component 412/422, e.g., in conjunction with processor(s) 403/453, memory 405/455, and/or transceiver 406/456, may be configured to perform an SCDD precoding operation for DFT-spread OFDM signals. In another aspect, for example, performing the SCDD precoding operation may include using W*D(k)*Ux as discussed herein (e.g., in Equation (3)), or using an SCDD scheme selected by a UE or a network entity discussed herein (e.g., at block 804 in the method 800). In some implementations, for example, the SCDD precoding operation may include precoding a reference signal (e.g., a CRS, a DMRS, a CSI-RS, or an SRS) or a control/data signal, enabling wideband channel estimation, or using hybrid SCDD and SFBC discussed herein.

At block 1004, the method 1000 may include performing the SCDD precoding operation after a DFT spreading and before mapping to physical subcarriers. In an aspect, for example, the SCDD component 361/302, the precoding component 412/422, e.g., in conjunction with processor(s) 403/453, memory 405/455, and/or transceiver 406/456, may be configured to perform an SCDD precoding operation after a DFT spreading and before mapping to physical subcarriers. In an implementation, for example, the physical subcarriers or tones may be OFDM subcarriers or tones.

At block 1006, the method 1000 may include performing the SCDD precoding operation after DFT spreading and mapping to physical subcarriers. In an aspect, for example, the SCDD component 361/302, the precoding component 412/422, e.g., in conjunction with processor(s) 403/453, memory 405/455, and/or transceiver 406/456, may be configured to perform an SCDD precoding operation after a DFT spreading and after mapping to physical subcarriers. In an implementation, for example, the physical subcarriers or tones may be OFDM subcarriers or tones.

Several aspects of a telecommunications system have been presented with reference to a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of examples or processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or 35 U.S.C. § 112, sixth paragraph, unless the element is expressly recited using the phrase "means for" or, in the case of a method claim, the element is recited using the phrase "step for."

What is claimed is:

1. A method for precoding in wireless communications, comprising:
    identifying a type of information for transmission;
    identifying a rank associated with the type of information; and
    performing a small cyclic delay diversity (SCDD) precoding operation based at least in part on the identified type of information or the rank, with the SCDD precoding operation being used in combination with space frequency block codes (SFBC) for diversity schemes with four or more transmit (TX) antennas and comprising:
    applying the SFBC over pairs of symbols comprising the information to create SFBC-encoded pairs of symbols; and
    applying the SCDD precoding operation over the SFBC-encoded pairs of symbols.

2. The method of claim 1, wherein the performing the SCDD precoding operation is represented by y=W*D(k)*$U_x$, wherein W is a fixed precoding matrix, D(k) is a tone-dependent cyclic delay matrix where k is a resource element (RE) index, and $U_x$ is a discrete Fourier transform (DFT) matrix.

3. The method of claim 1, wherein the type of information includes a reference signal, control information, or data.

4. The method of claim 3, wherein the performing the SCDD precoding operation comprises precoding the reference signal in a same way as precoding the data signal.

5. The method of claim 1, wherein the performing the SCDD precoding operation comprises precoding a cell-specific reference signal (CRS), a demodulation reference signal (DMRS), a channel state information reference signal (CSI-RS), or a sounding reference signal (SRS).

6. The method of claim 1, wherein the rank includes an indication of transmit diversity or open-loop multiple-input multiple-output (MIMO).

7. The method of claim 1, further comprising:
selecting a multiple-input multiple-output (MIMO) scheme; and
selecting an SCDD precoding scheme for the SCDD precoding operation based on the MIMO scheme and at least a precoding matrix, a cyclic delay matrix, or the identified rank.

8. The method of claim 1, wherein a channel state information reference signal (CSI-RS) is not precoded by the SCDD precoding operation and a network entity either semi-statically or dynamically indicates one or more cyclic delay values to a user equipment (UE), wherein the network entity receives feedback from the UE indicating which of the one or more cyclic delay values is selected by the UE.

9. The method of claim 1, wherein a network entity indicates to a user equipment (UE) whether or not to precode a sounding reference signal (SRS), wherein when the SRS is precoded by the SCDD precoding operation, the network entity either semi-statically or dynamically indicates one or more cyclic delay values to the UE, wherein the network entity receives feedback from the UE indicating which of the one or more cyclic delay values is selected by the UE.

10. The method of claim 1, wherein a user equipment (UE) chooses whether or not to precode a sounding reference signal (SRS), wherein when the SRS is precoded by the SCDD precoding operation, the UE selects a delay value without indication from a network entity, wherein the network entity receives feedback from the UE indicating the cyclic delay value selected by the UE.

11. The method of claim 1, wherein a network entity selects one or more cyclic delay values based on sounding reference signal (SRS) or channel state information (CSI) feedback, or based on a recommendation from a UE.

12. The method of claim 1, wherein a UE selects a cyclic delay value for uplink transmissions based on a downlink channel observation, or based on a recommendation from a network entity.

13. The method of claim 1, wherein the performing the SCDD precoding operation comprises performing the SCDD precoding operation for discrete Fourier transform (DFT)-spread orthogonal frequency division multiplexing (OFDM) signals,
wherein the SCDD precoding operation is performed after a DFT spreading and before mapping to physical subcarriers, or
wherein the SCDD precoding operation is performed after DFT spreading and mapping to physical subcarriers.

14. An apparatus for wireless communications, comprising:
a memory configured to store instructions; and
at least one processor communicatively coupled to the memory, wherein the at least one processor is configured to execute the instructions to:
identify a type of information for transmission;
identify a rank associated with the type of information; and
perform a small cyclic delay diversity (SCDD) precoding operation based at least in part on the identified type of information or the rank, with the SCDD precoding operation being used in combination with space frequency block codes (SFBC) for diversity schemes with four or more transmit (TX) antennas and comprising instructions to:
apply the SFBC over pairs of symbols comprising the information to create SFBC-encoded pairs of symbols; and
apply the SCDD precoding operation over the SFBC-encoded pairs of symbols.

15. The apparatus of claim 14, wherein the SCDD precoding operation is represented by $y=W*D(k)*U_x$, wherein W is a fixed precoding matrix, $D(k)$ is a tone-dependent cyclic delay matrix where k is a resource element (RE) index, and $U_x$ is a discrete Fourier transform (DFT) matrix.

16. The apparatus of claim 14, wherein the type of information includes a reference signal, control information, or data.

17. The apparatus of claim 16, wherein the at least one processor configured to execute the instructions to perform the SCDD precoding operation is further configured to execute the instructions to precode the reference signal in a same way as to precode the data signal.

18. The apparatus of claim 14, wherein the at least one processor configured to execute the instructions to perform the SCDD precoding operation comprises further instructions to enable wideband channel estimation.

19. The apparatus of claim 14, wherein the at least one processor configured to execute the instructions to perform the SCDD precoding operation comprises further instructions to precode a cell-specific reference signal (CRS), a demodulation reference signal (DMRS), a channel state information reference signal (CSI-RS), or a sounding reference signal (SRS).

20. The apparatus of claim 14, wherein the rank includes an indication of transmit diversity or open-loop multiple-input multiple-output (MIMO).

21. The apparatus of claim 14, further comprising:
a transmitter configured to transmit one or more signals in response to the at least one processor configured to execute the instructions to perform the SCDD precoding operation.

22. The apparatus of claim 14, wherein the at least one processor is further configured to execute the instructions to:
select a multiple-input multiple-output (MIMO) scheme; and
select an SCDD precoding scheme for the SCDD precoding operation based on the MIMO scheme and at least a precoding matrix, a cyclic delay matrix, or the identified rank.

23. The apparatus of claim 14, wherein a channel state information reference signal (CSI-RS) is not precoded by the SCDD precoding operation, wherein the at least one processor is configured to either semi-statically or dynamically indicate one or more cyclic delay values to a user equipment (UE), and wherein the apparatus receives feedback from the UE indicating which of the one or more cyclic delay values is selected by the UE.

24. The apparatus of claim 14, wherein a sounding reference signal (SRS) is precoded by the SCDD precoding operation, wherein the at least one processor is configured to either semi-statically or dynamically indicate one or more cyclic delay values to a UE, and wherein the apparatus receives feedback from the UE indicating which of the one or more cyclic delay values is selected by the UE.

25. The apparatus of claim 14, wherein the at least one processor is further configured to select one or more cyclic delay values based on sounding reference signal (SRS) or channel state information (CSI) feedback, or based on a recommendation from a UE.

26. The apparatus of claim 14, wherein the instructions to perform the SCDD precoding operation comprises instructions to perform the SCDD precoding operation for discrete Fourier transform (DFT)-spread orthogonal frequency division multiplexing (OFDM) signals, wherein the SCDD precoding operation is performed after a DFT spreading and before mapping to physical subcarriers, or wherein the SCDD precoding operation is performed after DFT spreading and mapping to physical subcarriers.

27. A non-transitory computer-readable medium storing computer executable code, comprising code, that when executed by a processor, cause the processor to:
   identify a type of information for transmission;
   identify a rank associated with the type of information; and
   perform a small cyclic delay diversity (SCDD) precoding operation based at least in part on the identified type of information or the rank, with the SCDD precoding operation being used in combination with space frequency block codes (SFBC) for diversity schemes with four or more transmit (TX) antennas and comprises:
   apply the SFBC over pairs of symbols comprising the information to create SFBC-encoded pairs of symbols; and
   apply the SCDD precoding operation over the SFBC-encoded pairs of symbols.

28. An apparatus for wireless communications, comprising:
   means for identifying a type of information for transmission;
   means for identifying a rank associated with the type of information; and
   means for performing a small cyclic delay diversity (SCDD) precoding operation based at least in part on the identified type of information or the rank, with the SCDD precoding operation being used in combination with space frequency block codes (SFBC) for diversity schemes with four or more transmit (TX) antennas and comprising:
   means for applying the SFBC over pairs of symbols comprising the information to create SFBC-encoded pairs of symbols; and
   means for applying the SCDD precoding operation over the SFBC-encoded pairs of symbols.

* * * * *